United States Patent [19]
Yanagisawa et al.

[11] Patent Number: 5,657,459
[45] Date of Patent: Aug. 12, 1997

[54] DATA INPUT PEN-BASED INFORMATION PROCESSING APPARATUS

[75] Inventors: Ryozo Yanagisawa, Matsudo; Kazutoshi Shimada, Yokosuka; Eisaku Tatsumi, Yokohama; Atsushi Tanaka, Kawasaki; Noriyuki Suzuki, Tokyo; Yuichiro Yoshimura, Kamakura; Kiyoshi Kaneko; Katsuyuki Kobayashi, both of Yokohama; Shinichi Sunakawa, Kawasaki; Katsuhiko Nagasaki, Ichikawa; Masaki Tokioka, Yokohama, all of Japan

[73] Assignee: Canon Kabushiki Kaisha, Tokyo, Japan

[21] Appl. No.: 118,756

[22] Filed: Sep. 10, 1993

[30] Foreign Application Priority Data

Sep. 11, 1992 [JP] Japan .................................. 4-243482
Sep. 11, 1992 [JP] Japan .................................. 4-243486
Sep. 11, 1992 [JP] Japan .................................. 4-243488
Dec. 24, 1992 [JP] Japan .................................. 4-344099

[51] Int. Cl.⁶ .................................................. G06F 13/00
[52] U.S. Cl. ................................... 395/326; 345/169
[58] Field of Search ................... 364/DIG. 1 MS File, 364/DIG. 2 MS File; 178/18, 19, 20; 345/156, 168, 169; 395/326, 899

[56] References Cited

U.S. PATENT DOCUMENTS 4,927,986  5/1990  Daly ............................................ 178/18
4,969,830  11/1990 Daly et al. ................................ 439/136
5,187,645  2/1993  Spalding et al. ........................ 361/393
5,333,116  7/1994  Hawkins et al. ...................... 364/708.1
5,408,250  4/1995  Bier .......................................... 345/169

FOREIGN PATENT DOCUMENTS 0378282  7/1990   European Pat. Off. .
0441400  8/1991   European Pat. Off. .
2536437  9/1976   Germany .
3943311  7/1990   Germany .
9011300  1/1991   Germany .
9106519  11/1991  Germany .
9016094  12/1990  WIPO .
9100625  1/1991   WIPO .

OTHER PUBLICATIONS

"Connector System Using Opto–Electronic Techniques To Avoid Contact Wear", IBM Technical Disclosure Bulletin, vol. 33, No. 3A, Aug. 1990, pp. 242–243.

*Primary Examiner*—Robert B. Harrell
*Attorney, Agent, or Firm*—Fitzpatrick, Cella, Harper & Scinto

[57] ABSTRACT

An information apparatus comprises a main apparatus and a subsidiary apparatus which are separable. The main and subsidiary apparatuses has electrical connectors which are connected substantially automatically when the two apparatuses are attached. The connectors are provided with covers which are movable in association with the attaching procedure. Thereby, the connectors can be kept clean and free from dust contamination or breakage, and the reliability of the information apparatus can be enhanced.

35 Claims, 34 Drawing Sheets

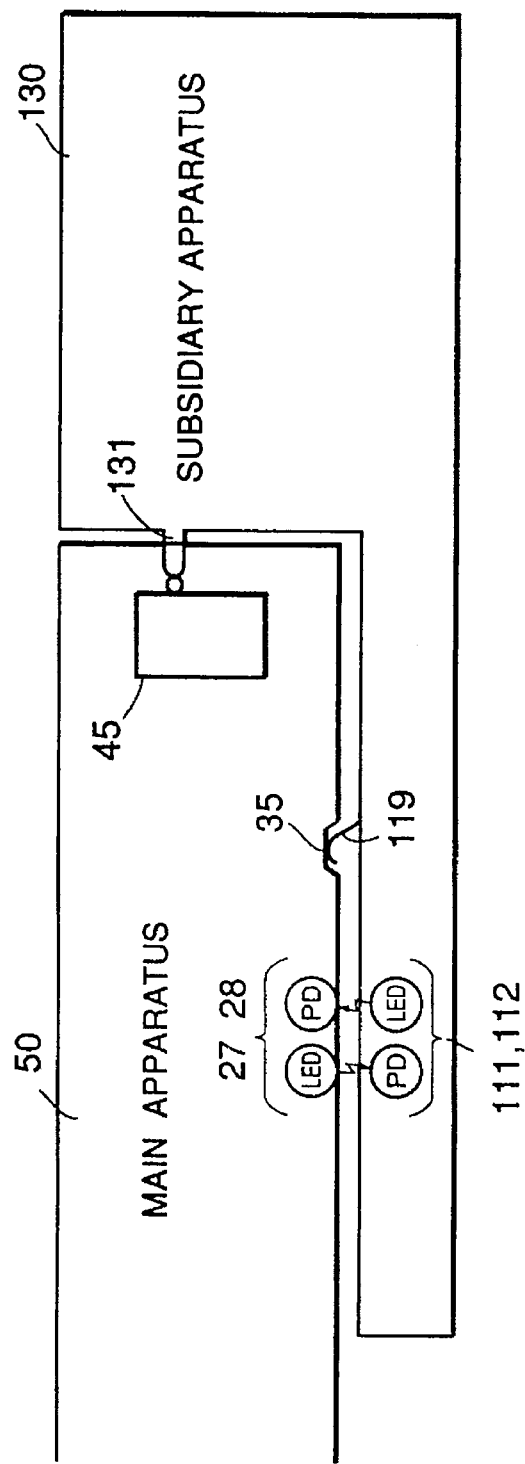
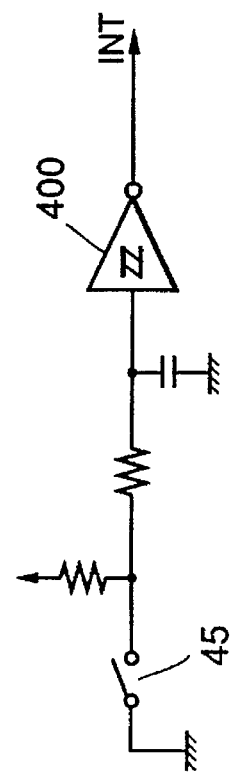

DATA INPUT PEN-BASED INFORMATION PROCESSING APPARATUS

BACKGROUND OF THE INVENTION

1. Field of the Invention

The present invention relates to an information apparatus, such as a personal computer, and, more particularly, to an information apparatus separable into a main apparatus and a subsidiary apparatus.

2. Description of the Related Art

Along with a trend toward downsizing, various portable information apparatuses have been developed, for example, notebook-type computers and handy terminals. However, the conventional way of downsizing for such portable information apparatuses is not altogether satisfying. Some portable information apparatuses partially give up performance and functions in exchange for downsizing, reducing the ease of operation or the freedom to construct systems with other apparatuses.

Recently, some personal computers employ pen-base input means, instead of keyboards, which also substantially impede the downsizing of such computers. Such a pen-base computer has an input digitizer provided on a display such as a liquid crystal display (LCD). The trace of the pen is inputted by means of the digitizer, and displayed on the display as it is actually drawn by the user. Thus, a user can input data thereto just like writing on a sheet of paper. The direction of data input or display can also be changed as desired.

However, in a separable system, either a portable computer system or a pen-base computer, comprising a main computer apparatus and a subsidiary apparatus which are connected by a connecting cord, it is troublesome to connect or disconnect the connecting cord. Moreover, the cord may obstruct a user's easy operation.

Further, when a portable system is transported or left unused, the connector portions of the main and subsidiary (node) apparatuses are likely to be contaminated with dust or the like. Thus, reliability of the connector portions is poor. Such connector portions may be provided with covers, but such covers must be opened or shut each time the main and subsidiary apparatus are connected or disconnected.

Similarly, a pen-base computer suffers poor reliability of the connector portions. Because it is used in various locations and the subsidiary apparatus is connected to the main apparatus in various manners (input directions), the connector portions are frequently subjected to dust or the like.

Further, a conventional pen-base computer is not provided with means for achieving attachment and detachment of the subsidiary apparatus in manners suitable for the respective input directions. Still further, a pen-base computer is not provided with means for attaching the subsidiary apparatus to the main apparatus in such a manner that the display is easy to see if the computer is connected to a keyboard for facilitating inputting a large amount of data. Therefore, various inconveniences are caused.

Further, in a pen-base computer, a key board connector is provided in the subsidiary apparatus, not in the main apparatus. In many cases, the main apparatus and separate subsidiary apparatuses exchange data by means of buses connected by interface cables. However, because many connector pins for such cables are required, it is not easy to connect or disconnect the cables.

The main apparatus and a subsidiary apparatus can be connected by one pair of data cables (optical cables) by using non-contact optical communication, which enables high-speed data communication therebetween. This communication method facilitates connecting one main apparatus to one or more subsidiary apparatuses (nodes) or one subsidiary apparatus to a plurality of devices. This optical communication protocol normally uses polling selecting scheme. The CSMA/CD, which is widely used for network schemes including collision detection, is normally avoided because the CSMA/CD will slow down the communication process.

In the polling selecting scheme, a computer always serves as a main apparatus. More specifically, the computer always polls a subsidiary apparatus first, and the subsidiary apparatus responds to the polling. For example, if the computer is connected to a subsidiary apparatus, such as a keyboard, requiring the computer to periodically determine whether there has been an input therefrom, the computer periodically sends a polling signal to the keyboard inquiring whether there has been a key input and which key has been pressed, and the keyboard, that is, the subsidiary apparatus, answers the inquiry. The keyboard is not provided with means for spontaneously informing the main apparatus of a key input without receiving an inquiry from the main apparatus. If the computer is connected to a subsidiary apparatus, such as a floppy disk drive (FDD), which requires an instruction from the computer, the computer outputs an access instruction to the FDD, and the FDD reads data from the floppy disk and outputs the data to the computer, or writes data from the computer onto the floppy disk (selecting). Because a computer always operates as a main apparatus in the polling selecting scheme, the scheme prevents collision between instruction signals and therefore simplifies the protocol.

However, because the above-described conventional scheme requires the main apparatus to always make polling for detecting the status of each I/O and exchanging data with a subsidiary apparatus, the main apparatus must keep polling even when the main and subsidiary apparatuses are separated from each other and each apparatus operates independently. Therefore, electricity is continuously consumed by the CPU operation and communication controlling units, and the light emitting and receiving units.

SUMMARY OF THE INVENTION

An object of the present invention is to facilitate the inputting operation, the attaching and detaching operation, the transportation of the apparatus and other operations, and enhance the reliability of the information apparatus.

According to one aspect of the present invention, an information apparatus comprises: a first casing having information inputting means employing a pen to input information, display means, communication means and attaching means; and a second casing having communication means and attaching means, whereby the first casing and the second casing are attachable to each other, and wherein one of the attaching means of the first casing and the attaching means of the second casing facilitates at least two different manners of attachment of the first and second casings in terms of relative directions, and wherein one of the first and second casings has detaching means for detaching the first casing and the second casing from each other. Because the first and second casings, that is, main and subsidiary apparatuses, respectively, can be attached so that the subsidiary apparatus takes a position relative to the main apparatus suitable for a desired input direction, the information apparatus of the present invention achieves significantly easy input manners.

According to another aspect of the present invention, the detaching means is provided in the second casing. The weight of the first casing can be accordingly reduced, thereby enhancing the portability of the first casing.

According to still another aspect of the present invention, the second casing is provided with a retractable stand. By using the stand, the attached first and second casing, that is, main and subsidiary apparatuses, can be placed in a posture suitable for using a keyboard to input a large amount of data. Such posture will makes the display easy to see.

According to a further aspect of the present invention, the communication means of the first and second casings include wireless communication means, for example, optical communication means. Further, one of the first and second casings may be provided with at least two units of power supply contacts, the other casing being provided with at least one unit of power supply contacts. Thereby, the information apparatus of the present invention does not require connecting cords between the first and second casings, and eliminates the troubles caused by the connecting cords.

According to a still further aspect of the present invention, at least a portion of the attaching means is provided on the bottom surface of the first casing so that, when the first and second casings are attached, at least a portion of the second casing is positioned adjacent to the bottom surface of the first casing. Thereby, when the attached first and second casings are placed on a desk or the like, the input panel is tilted toward the operator; more specifically, the side of the input panel closer to the operator becomes lower than the side remote from the operator. Therefore, the information apparatus of the present invention significantly facilitates the inputting operation.

According to a further aspect of the present invention, the second casing has at least one surface which faces at least one side surface of the first casing when the first and second casings are attached, the surface also serving as guide means during the attaching operation, thereby significantly facilitating the attaching and detaching operations.

According to a yet further aspect of the present invention, at least one of the first and second casings has cover means for covering the electrically connecting means, the cover means being movable in association with the attaching and detaching operations. Because the electrically connecting means is thereby covered when the first and second casings are detached form each other, the electrically connecting means can be kept clean and free from dust contamination and failure or breakage caused by dust. Therefore, the information apparatus of the present invention achieves high reliability and safety.

According to a further aspect of the present invention, at least one of the electrically connecting means of the first casing and the electrically connecting means of the second casing is movable in association with the attaching and detaching operations. Thereby, the electrically connecting means can be positioned inside the casing when the first and second casings are separated. Therefore, the information apparatus of the present invention achieves high reliability and safety.

According to a still further aspect of the present invention, an information apparatus comprises: a first casing having information inputting means employing a pen to input information, display means, communication means and attaching means; and a second casing having communication means and attaching means, whereby the first casing and the second casing are attachable to each other, the information apparatus further comprising detaching means for detaching the first casing and the second casing from each other. Because the first and second casings, that is, main and subsidiary apparatuses, respectively, can be attached so that the subsidiary apparatus takes a position relative to the main apparatus suitable for a desired input direction, the information apparatus of the present invention achieves significantly easy input manners.

According to a further aspect of the present invention, the detaching means is provided in the second casing. The weight of the first casing can be accordingly reduced, thereby enhancing the portability of the first casing.

According to a yet further aspect of the present invention, an information apparatus comprises: an input pen; a casing having an input panel to which information is inputted by means of the input pen; connector means for connecting the input pen to the casing; and at least one hook portion for hooking a portion of the connector means, the hook portion being provided in the casing. Thereby, the connecting means can be selectively placed conveniently for either a right-hander operator or a left-hander operator. More specifically, the connecting means can be placed at either the right-hand side or the left-hand side regardless of the input direction. Therefore, the information apparatus of the present invention is easy to use.

According to a further aspect of the present invention, an electronic system comprises: a first apparatus and a second apparatus which are separated provided; detecting means for detecting contact between the first and second apparatuses; and power supplying means for supplying power to receiver-transmitter means of the first and second apparatuses when the detecting means has detected contact between the first and second apparatuses. Thereby, the consumptive power of the electronic system can be significantly reduced. Similarly, an other aspect of the present invention provides a power supply control method.

According to a further aspect of the present invention, the first and second apparatuses can be driven by using a power source connected one of the first and second apparatuses.

According to a yet further aspect of the present invention, the electronic system is provided with means for applying current, only when necessary, to the electrode means of the first and second apparatuses for supplying power form one apparatus to the other. Thereby, short-circuit of a power source or the like can be prevented. Similarly, a further aspect of the present invention provides a power supply control method which prevents short-circuit of a power source or the like.

Further objects, features and advantages of the present invention will become apparent from the following description of the preferred embodiments with reference to the attached drawings.

BRIEF DESCRIPTION OF THE DRAWINGS

FIG. 26(A) illustrates connection between the main apparatus and the subsidiary apparatuses.

FIG. 26(B) illustrates a signal outputting circuit of a attachment detecting means provided in the main body.

DETAILED DESCRIPTION OF THE PREFERRED EMBODIMENTS

The preferred embodiments of the present invention will be described in detail hereinafter with reference to the attached drawings.

[First Embodiment]

A first embodiment of the information apparatus of the present invention is essentially composed of: a main apparatus comprising a digitizer, a liquid crystal display (LCD), a CPU, a battery and a backup memory HDD; and a subsidiary apparatus comprising a floppy disk drive (FDD), an I/O port such as RS232C, and a network interface.

The main apparatus and the subsidiary apparatus are detachably connected. The subsidiary apparatus can be attached to the main apparatus in two ways in accordance with placements of the main apparatus when it is used, that is, lateral attachment or longitudinal attachment where the subsidiary apparatus is situated along a longer side or a shorter side, respectively, of the main apparatus.

First, the construction of the main apparatus will be described.

Figure 1:
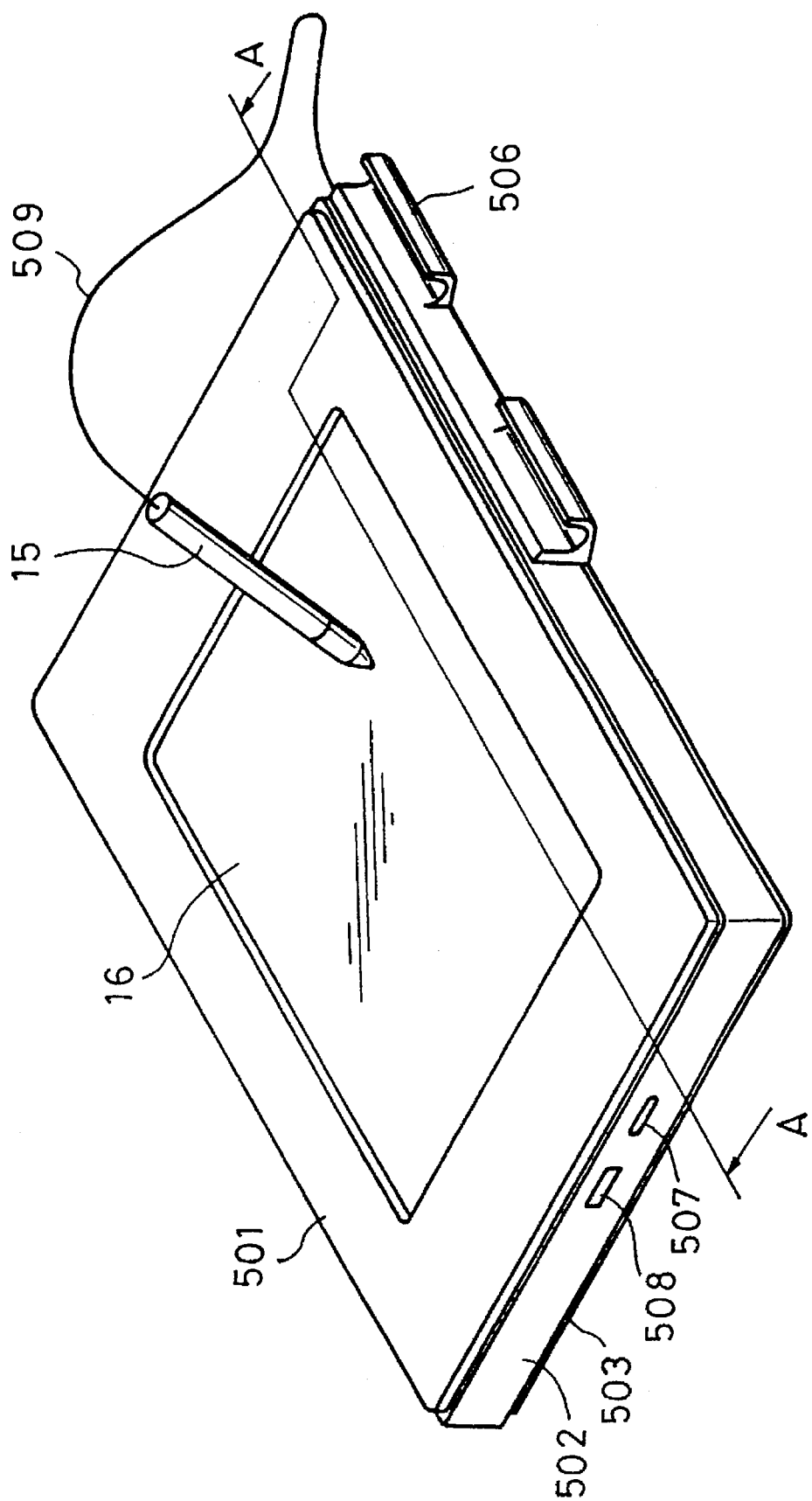
FIG. 1 is a perspective exterior view of the main body of a first embodiment of the information apparatus of the present invention.

As shown in FIG. 1, the main apparatus has substantially the shape of a rectangular parallelepiped. The shape of the main apparatus is formed by a top casing 501, an intermediate casing 502 and a bottom casing 503 which are made of resin. The top casing 501 has a substantially rectangular opening provided in a central portion. The opening is provided with a digitizer 16 which serves as a coordinate information input panel. An LCD is provided under the digitizer 16. Side walls of the main apparatus that are formed by the intermediate casing 502 are provided with a holder 506 for an input pen 15 described later, a main switch 507, an LCD contrast adjusting knob 508, an IC card connector (not shown), a DC jack (not shown), etc. The left side wall and the remote side wall of the main apparatus (when viewed with the longer sides running along the depth of the sight of a viewer, that is, longitudinally with respect to the viewer) are provided respectively with two substantially semi-tubular guide recesses 513a–513d (shown in FIG. 2) which form parts of attaching means for connecting the main apparatus and a subsidiary apparatus. A connector for the input pen 15 is provided adjacent to the center of the right side wall. In this embodiment, the connector is covered with the holder 506 and hidden behind the holder 506. The input pen 15 is connected to the connector by a cord 509. The holder 506 and the side wall are constructed so as to form a gap therebetween, in which the cord 509 can be rolled up.

Figure 2:
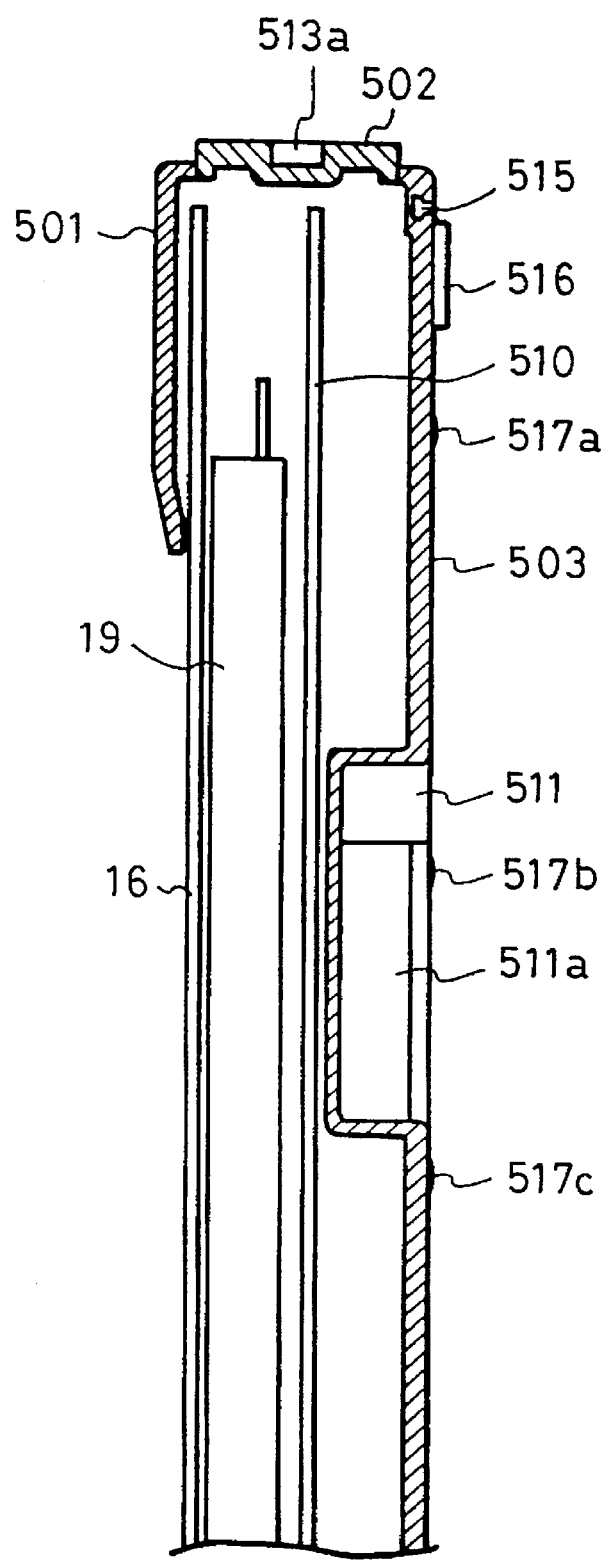
FIG. 2 is a schematic section taken on line A—A of FIG. 1.
Figure 3:
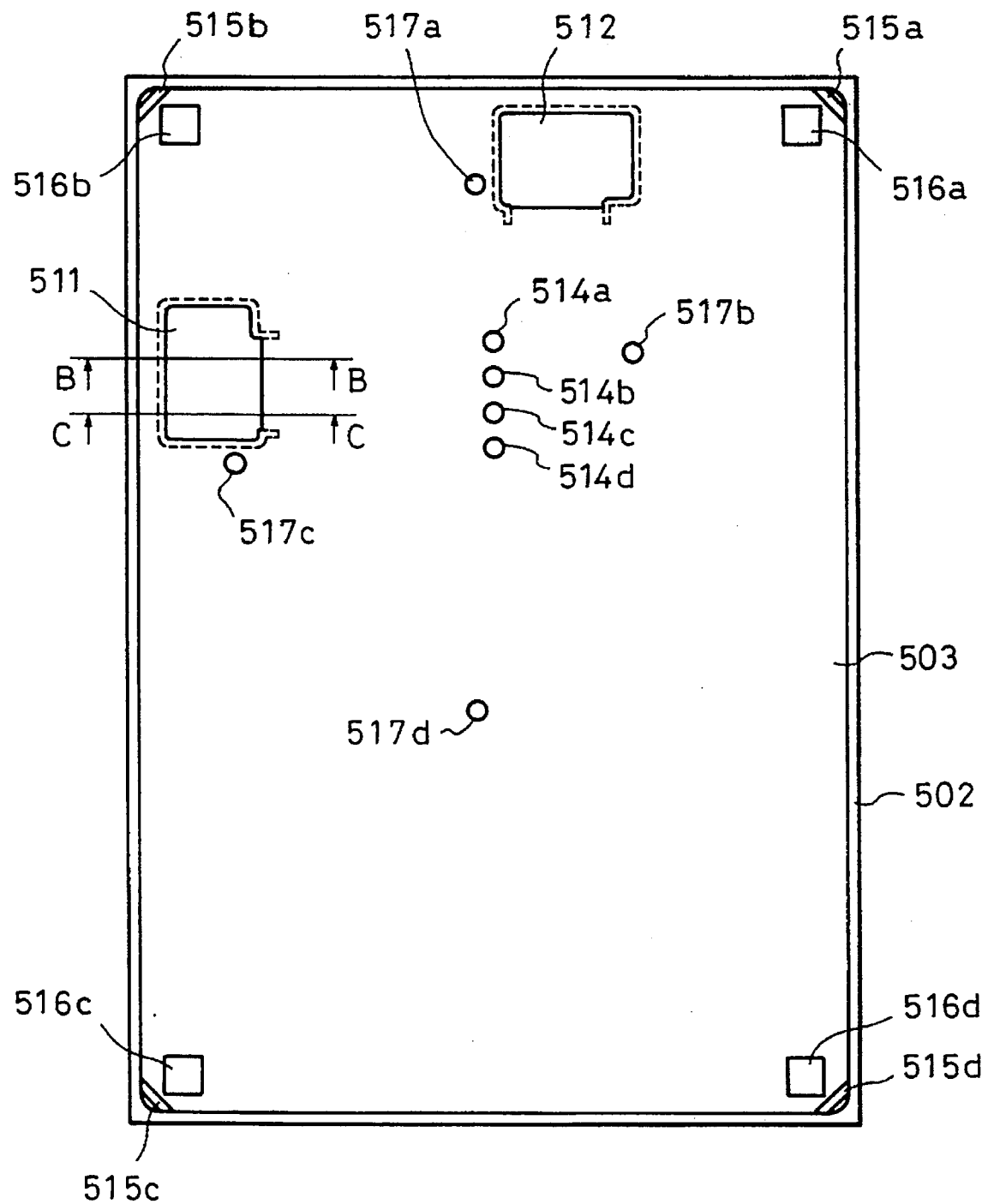
FIG. 3 is a bottom plan view of the main body shown in FIG. 1.

Referring to FIGS. 2 and 3, a schematic sectional view (taken on line A—A of FIG. 1) and a bottom plan view of the main apparatus, the digitizer 16 and the underlying LCD 19 are fastened to the intermediate casing 502. A printed circuit board 510 underlies the LCD 19. The printed circuit 510 carries a CPU, a memory, an LCD controller, a digitizer control unit, a power supply circuit, etc. The intermediate casing 502 is fastened to the top casing 501 and the bottom casing 503 by screws or elastic hooks (click-on fastening). The bottom surface formed by the bottom casing 503 has: two recesses 511, 512 and a plurality of hemispherical projections 517a–517d forming part of the attaching means; a plurality of windows 514a–514d aligned longitudinally and provided with light sources and light sensors for optical communication; grooved portions 515a–515d and rubber feet 516a–516d provided in the four corner portions. The cord 509 can be inserted and hooked in the grooved portions 515a–515d. The height of the projections 517a–517d are less than the height of the rubber feet 516a–516d. The recesses 511 and 512 are formed so as to receive a stopper knob 604 provided on a subsidiary apparatus shown in FIG. 6.

Figure 4:
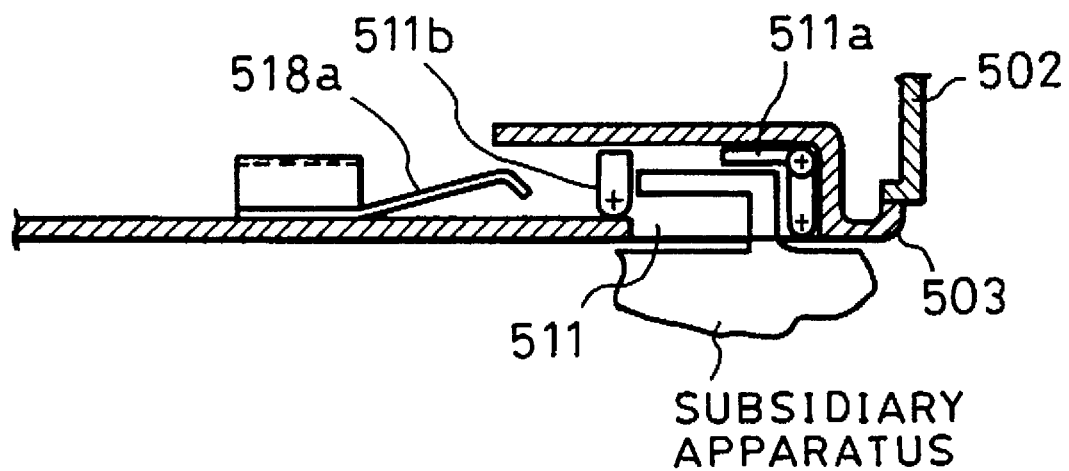
FIG. 4 is a schematic section of a recess portion of the main body taken on line B—B of FIG. 3.
Figure 5:
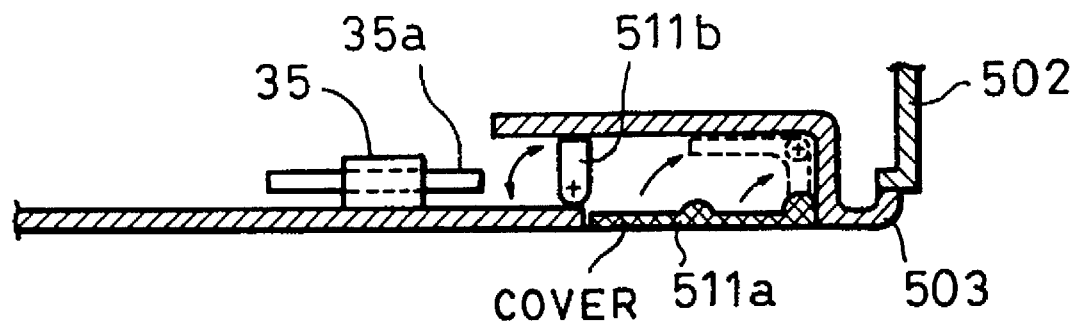
FIG. 5 is a schematic section of the recess portion taken on line C—C of FIG. 3.

The two recesses 511 and 512 are constructed substantially in the same manner, except that the recess 512 is in a posture achieved by rotating the recess 511 by 90° clockwise. FIG. 4 is a first schematic sectional view of the recess 511 taken on line B—B of FIG. 3. The recess 511 has a cover 511a provided on a portion of one side wall of the four side walls of the recess 511. A plate spring 518 is provided at the inner side of the cover 511a. The cover 511a is pivotably supported by a shaft provided at a predetermined position, and urged by a spring (not shown) so as to assume a closed position. FIG. 5 is a second schematic sectional view taken on line C—C. Electrodes 35 composed of two electrode pins 35a, 35b are provided at the inner side of the cover 511a. Further, an attachment detecting switch 511b is provided in the inner side of the cover 511a.

The construction of the digitizer 16 will be described.

The digitizer 16 of this embodiment is an ultrasonic type. The digitizer 16 comprises: a vibrating input pen 15 containing a vibrator; a vibration propagating plate made of, e.g., glass, for propagating the vibration inputted by the input pen 15; a plurality of vibration sensors adhered or compression-fixed to the propagating plate; a vibration damper for damping vibration, provided adjacent to the periphery of the propagating plate; and a detecting circuit for detecting signals from the sensors to measure the propagation time of vibration. Based on a measured propagation time and a propagation speed stored beforehand, the digitizer 16 calculates the distances between the input pen 15 and the respective sensors, which are fixed in position, and then performs geometric calculation to determine the position of the input pen 15, thereby outputting the coordinate information regarding the input pen 15. A highly transparent glass plate can be used to form the input panel of the digitizer 16, thereby achieving an input panel of the digitizer 16 which will not disturb the visibility of the LCD 19 underlying the digitizer 16.

The construction of a subsidiary apparatus will be described.

Figure 6:
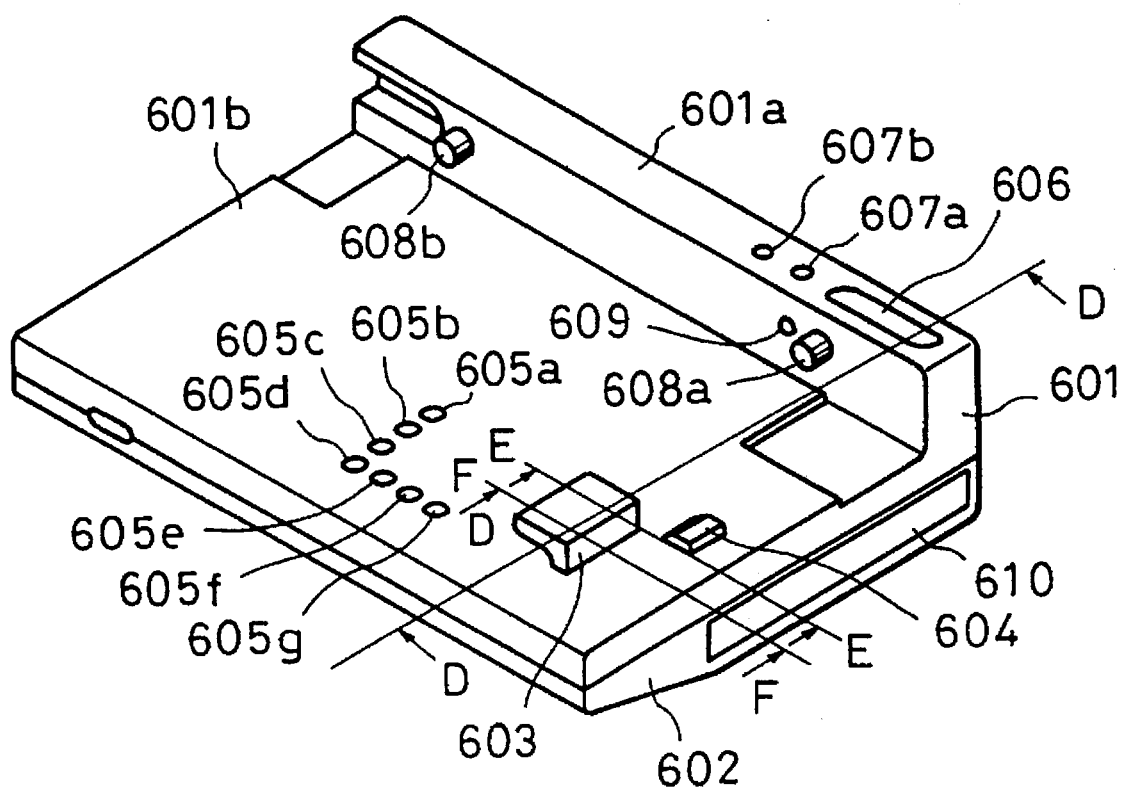
FIG. 6 is a perspective exterior view of a subsidiary apparatus of the first embodiment of the information apparatus of the present invention.
Figure 21:
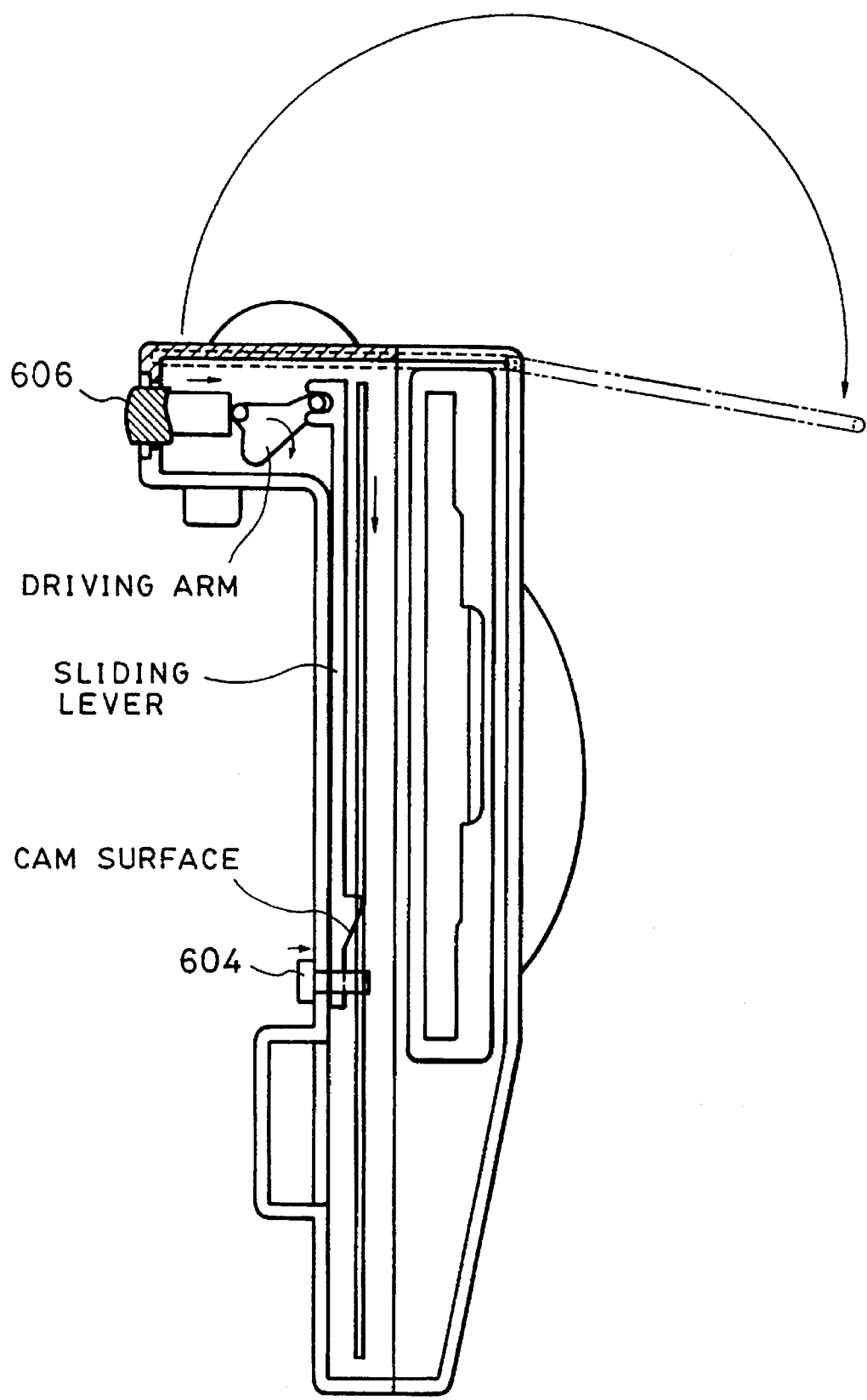
FIG. 21 is a sectional view of the subsidiary apparatus illustrating the stand.
Figure 22:
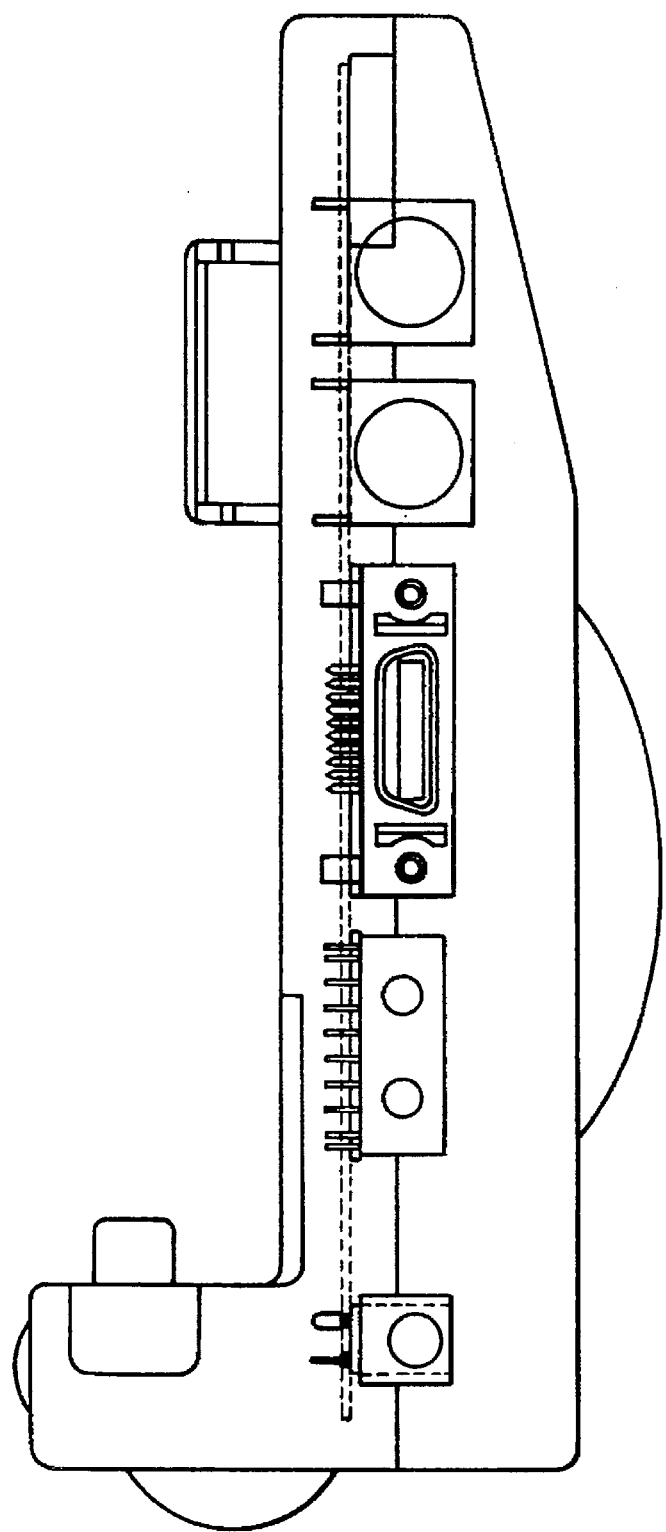
FIG. 22 is a side view of the subsidiary apparatus.

FIG. 6 is a perspective exterior view of the subsidiary apparatus. The shape of the subsidiary apparatus is essentially formed of a combination of a substantially rectangular parallelepiped base and a long projection 601a having a substantially rectangular parallelepiped shape provided on top of the base, along one side thereof. The right and left-hand side surfaces of the subsidiary apparatus each have substantially the shape of a letter "L". The subsidiary apparatus comprises a top casing 601 and a bottom casing 602 made of resin. The subsidiary apparatus has a width (the dimension along the longer sides) substantially equal to the width of the main apparatus (the dimension along the shorter sides thereof). A top surface 601b (excluding the projection 601a) formed by the top casing 601 is provided with: a hook portion 603 and a stopper knob 604 which form part of the attaching means; and a plurality of windows 605a–605g for an optical communication unit comprising a light source and a light sensor, the window 605a–605g being orthogonally aligned along both the depth (the shorter dimension) and the width (the longer dimension) of the subsidiary apparatus. The stopper knob 604 is urged upward by a spring (not shown). The stopper knob 604 moves down to the level of the top surface 601b when receiving a certain force. A top surface of the projection 601a is provided with: a release button 606 forming part of means for detaching the subsidiary apparatus from the main apparatus; and a plurality of LED indicators 607a, 607b for indicating the status of power, the operation of an FDD, etc. When the release button 606 is manually pushed down, the stopper knob 604 is moved down by transmission means including a driving arm and a sliding lever contained by casings 601 and 602 as shown in FIG. 21. An inside wall of the projection 601a has a pair of guide pins 608a, 608b provided in right and left-hand portions thereof. An operating pin 609 for the attachment detecting switch is provided adjacent to a guide pin 608a. An FDD 610 is provided adjacent to one of the "L"-shape side walls. The other "L"-shape side wall is provided with an I/O port, a network interface, a keyboard connector, a DC jack, etc., as shown in FIG. 22.

Figure 7:
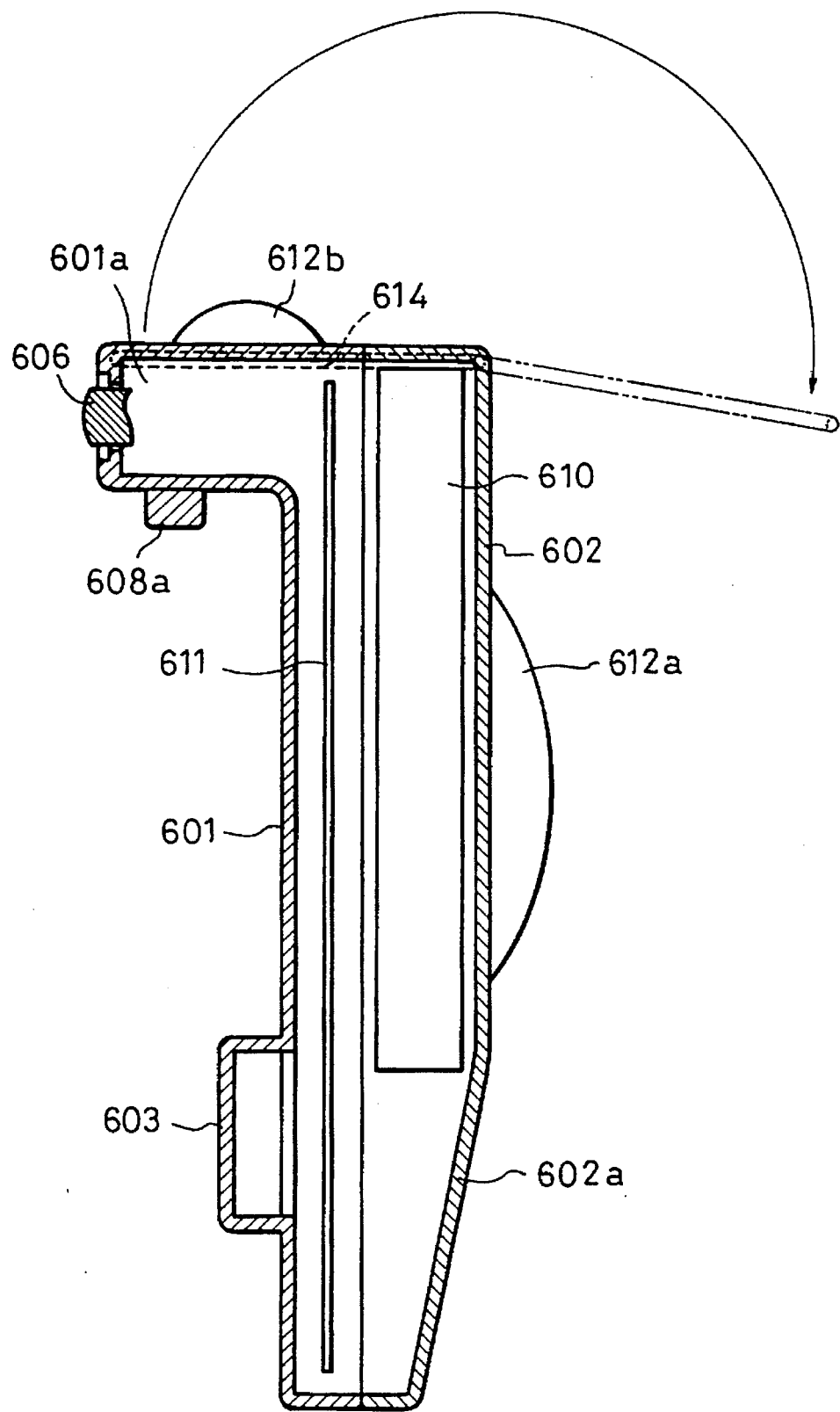
FIG. 7 is a schematic section taken on line D—D of FIG. 6.

FIG. 7 is a schematic sectional view of the subsidiary apparatus taken on line D—D of FIG. 6. A printed circuit board 611 carrying a CPU, a memory, optical communication means, etc., is fixed to the top casing 601. The FDD 610 is fixed to the bottom casing 602. The bottom surface of the bottom casing 602 and a side surface of the projection 601a are provided with nonskid rubber feet 612a, 612b for preventing the subsidiary apparatus from slipping when the subsidiary apparatus is attached to the main apparatus. A stand 614 is provided in the side wall of the projection 601a. The stand 614 is pivotably supported by a hinge disposed adjacent to the bottom surface. The bottom casing 602 has a tapered bottom surface 602a adjacent to the front side of the subsidiary apparatus. The tapered surface 602a is formed so that, when an assembly of the main and subsidiary apparatuses is placed on a horizontal surface, such as the top surface of a desk, one or more of the rubber feet 612a, 516a–516d provided on the subsidiary and main apparatuses will unfailingly contact the horizontal surface, thereby stabilizing the assembly in a posture in which the main apparatus is tilted forward.

Figure 8:
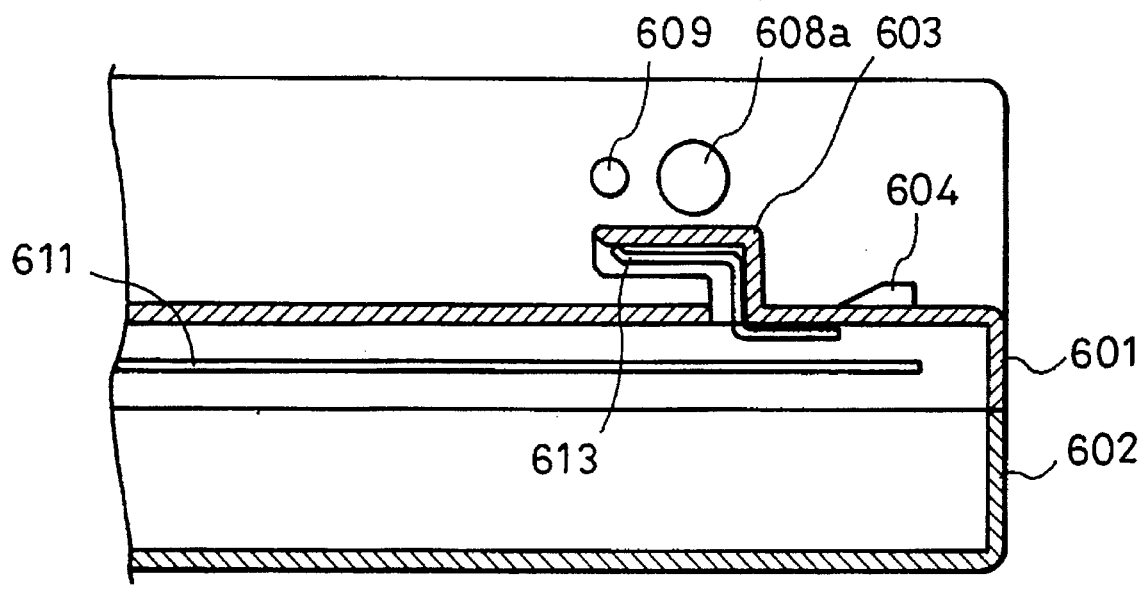
FIG. 8 is a schematic section of a hook portion of the subsidiary apparatus taken on lone E—E of FIG. 6.
Figure 9:
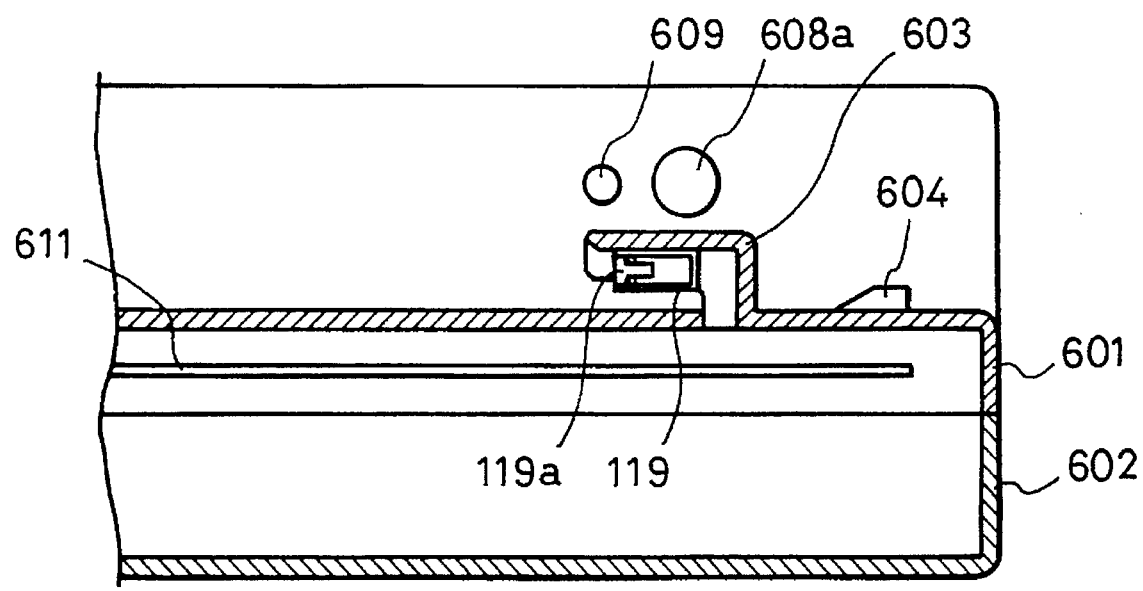
FIG. 9 is a schematic section of the hook portion taken on line F—F of FIG. 6.

FIG. 8 is a first schematic sectional view of the hook portion 603 of the subsidiary apparatus taken on line E—E of FIG. 6. A reinforcement plate 613 formed of a steel plate is provided inside the hook portion 603. FIG. 9 is a second schematic sectional view of the hook portion taken on line F—F of FIG. 6. Electrodes 119 composed of two electrode pins 119a, 119b are provided inside the hook portion 603. The electrode pins 119a, 119b are axially urged by spring means (not shown).

The attaching/detaching means for interconnecting the main and subsidiary apparatus will be described. The attaching means and procedure for attachment will be first described.

FIGS. 10(a) to 10(d) illustrate longitudinal attachment between the subsidiary apparatus and the main apparatus in which the subsidiary apparatus is situated along a shorter side of the main apparatus. This attachment is suitable for a longitudinal placement of the main apparatus with respect to a user. First, the positional relation between the main and subsidiary apparatuses and the states thereof when attachment is completed will be described with reference to FIG. 10(d). When attachment is completed, the subsidiary apparatus is positioned adjacent to the side surface remote from a user and the bottom surface of the main apparatus. The width (the shorter dimension) of the main apparatus substantially coincides with the width of the subsidiary apparatus without positional deviation. A gap of a predetermined size is formed between the remote side surface of the main apparatus and the inner side surface of the projection 601a of the subsidiary apparatus. The guide pins 608a, 608b of the subsidiary apparatus are fitted in the guide recesses 513a, 513b provided on the remote side wall of the main apparatus. The hook portion 603 of the subsidiary apparatus is positioned in the recess 511 formed in the bottom surface of the main apparatus. More specifically, the cover 511a of the recess 511 is pushed open by a portion of the hook portion 603, and therefore the portion is inserted in the main apparatus. The reinforcement plate 613 of the hook portion 603 is urged upward by the plate spring 518a. The top surface 601b of the top casing 601 is in contact with one or more of the recesses 517a–517d of the bottom surface of the main apparatus. Thereby, the main and subsidiary apparatus are attached with a very small vertical positional latitude (along the thickness). The depthwise positional latitude therebetween (along the length of the main apparatus) is restricted to a very small amount by abutments between the bottom surfaces of the guide recesses 513a, 513b and the tips of the guide pins 608a, 608b and abutment between a remote side surface of the recess 511, the surface being adjacent to the cover 511a, and a side surface of the hook portion 603, the side surface being close to the projection 601a. The lateral positional latitude (in the right-left directions) is restricted to a very small amount by abutment between a surface (not shown) of the recess 511, the surface being at the inner side of the cover 511a, and the tip of the hook portion 603, and abutment between the one curved surface of the guide recess 513a and a peripheral surface of the guide pin 608a, and further by the right-hand side surface of the recess 511 and the stopper knob 604 positioned with a predetermined gap left therebetween. When the main and subsidiary apparatuses are attached, the attachment detecting switch provided at the inner side of the cover 511a is pressed by a portion of the hook portion 603 so as to operate. At the same time, the attachment detecting switch of the subsidiary apparatus is operated by the operating pin 609 being pushed in by the remote side wall of the main apparatus. The depthwise-aligned (with respect to the user) optical communication windows 514a–514d of the bottom surface of the main apparatus substantially coincide with the depthwise-aligned optical communication windows 605–605d of the subsidiary apparatus. The electrodes 35a, 35b of the main apparatus and the electrodes 119a, 119b of the subsidiary apparatus are electrically connected by a predetermined force exerted by the springs. When the assembly of the main and subsidiary apparatuses is placed on a horizontal surface, for example, a desk surface, the input panel tilts at a predetermined angle by means of the rubber foot 612a of the subsidiary apparatus.

Figure 10A:
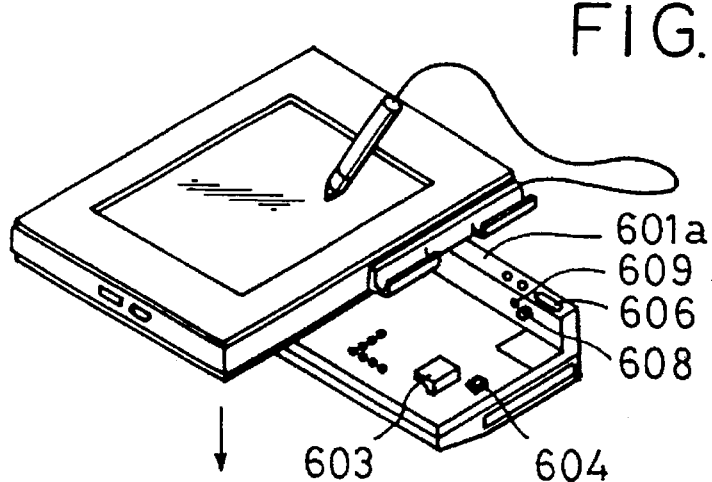
FIGS. 10(a), 10(b), 10(c) and 10(d) illustrate the procedure to achieve longitudinal attachment of the first embodiment where the subsidiary apparatus is situated along a longer side of the main apparatus.
Figure 10B:
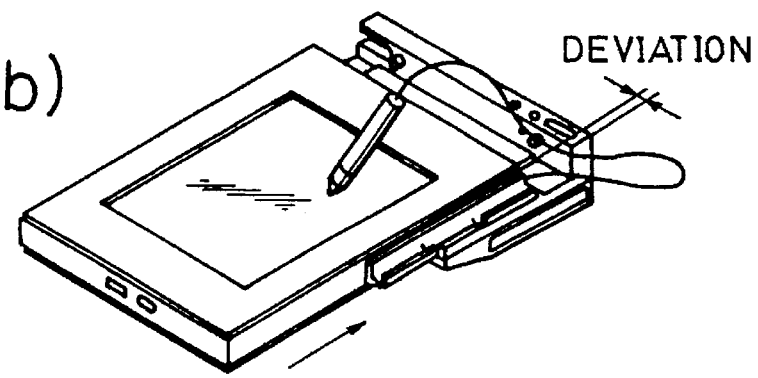
Figure 10C:
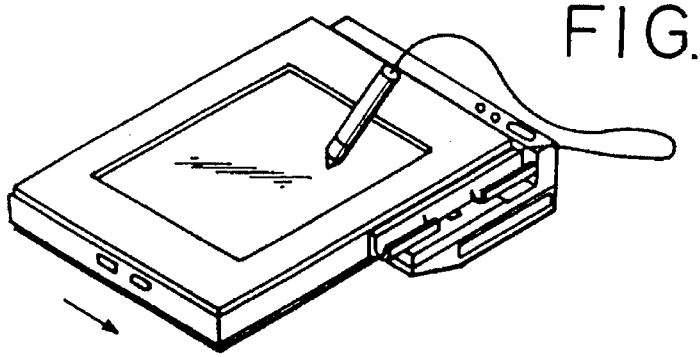
Figure 10D:
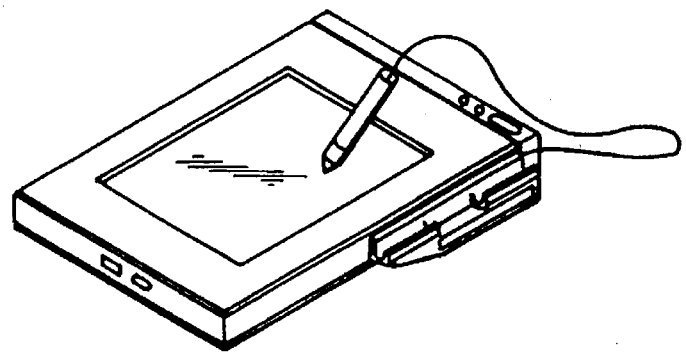

Next, the attachment procedure will be described. First, the main apparatus is placed on the top surface 601b of the subsidiary apparatus, as shown in FIG. 10(a). At this moment, the main and subsidiary apparatus are deviated from each other in the right-left directions, that is, along the shorter sides of the main apparatus, as shown in FIG. 10(b). More specifically, the subsidiary apparatus is shifted a predetermined distance to the right from the main apparatus. Further, the remote side surface of the main apparatus is a predetermined distance apart from the inner side surface of the projection 601a of the subsidiary apparatus. Naturally, the guide pins 608a, 608b are not inserted in the guide recesses 513a, 513b yet. On the other hand, the hook portion 603 of the subsidiary apparatus is positioned in the recess 511 of the bottom surface of the main apparatus. Subsequently, the main apparatus is moved so that the remote side surface of the main apparatus abuts the inner side surface of the projection 601a, as shown in FIG. 10(c). By this procedural step, the guide pins 608a, 608b are inserted in the guide recesses 513a, 513b. The operating pin 609 is positioned in the guide recess 513a but not pressed yet. Thus, the attachment detecting switch still remains off. Then, the main apparatus is moved to the right relatively to the subsidiary apparatus so as to assume a position as shown in FIG. 10(d). By this procedural step, the surface (not shown) of the recess 511 adjacent to the opening 511a abuts the tip of the hook portion 603 of the subsidiary apparatus, and the curved surface of the guide recess 513a abuts the peripheral surface of the guide pin 608a, thereby positioning the main and subsidiary apparatuses in the right-left directions. Further, by this procedural step, the hook portion 603 is inserted in the opening portion 511a of the recess 511, and the stopper knob 604 is pushed down by the bottom surface of the main apparatus and then rises back into the recess 511 by a force from the spring.

The detachment procedure will be described. The main apparatus is relatively moved to the left from the subsidiary apparatus while the release button 606 is being pressed down so that the stopper knob 604 is lowered. Then, the main apparatus is relatively moved depthwise with respect to the user from the subsidiary apparatus so as to release the guide pins 608a, 608b from the guide recesses 513a, 513b, thus completing the detachment procedure.

Next, lateral attachment of the subsidiary apparatus to the main apparatus suitable for the lateral placement with respect to a user and the detachment therefrom will be described.

Figure 11:
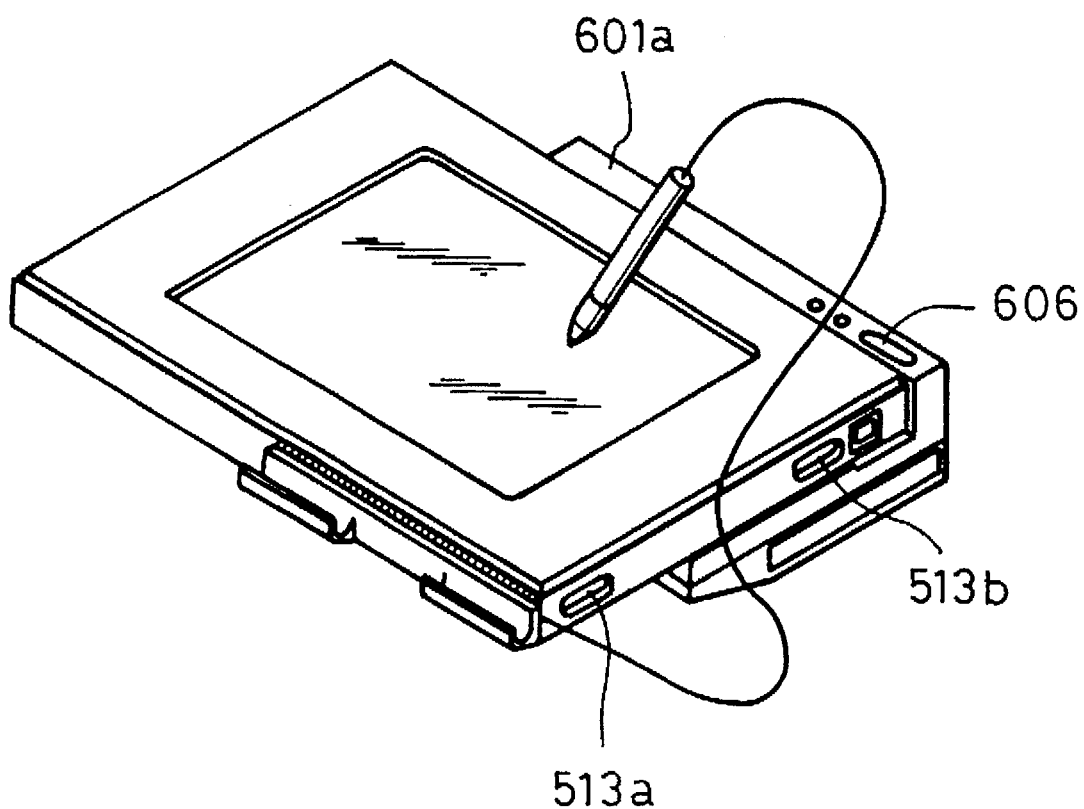
FIG. 11 illustrates lateral attachment of the first embodiment.

The lateral placement of the main apparatus is substantially achieved by rotating the longitudinal placement thereof 90° clockwise. FIG. 11 illustrates the lateral placement and attachment of the main and subsidiary apparatuses. When attachmen is completed, the left-hand side of the main apparatus in the longitudinal placement comes to the remote side in the lateral placement. The remote side in the longitudinal placement comes to the right-hand side in the lateral placement. The positional relations between the guide recesses 513c, 513d and the guide pins 608a, 608b and between the recess 512 and the hook portion 603, and the states and attaching movements thereof in lateral attachment are substantially the same as the positional relation, states and attachment movements of the same or corresponding portions in longitudinal attachment. More specifically, the positions of the guide recesses 513a, 513b, the recess 511, etc., that function in longitudinal attachment, with respect to the remote-side right-hand vertex of the main apparatus in the longitudinal placement, are substantially the same as the positions of the guide recesses 513c, 513d, the recess 512, etc., that function in lateral attachment, with respect to the remote-side right-hand vertex of the main apparatus in the lateral placement. The optical communication windows 514a–514d of the bottom of the main apparatus substantially coincide with the windows 605d–605g aligned in the right-left directions. If the intersection of orthogonally aligned windows 605a–605g, that is, the center of the window 605d, substantially coincides with the intersecting point of two straight lines extending from the remote-side right and left vertexes of the main apparatus in the longitudinal placement at 45° with respect to the remote side, the window 605d at the intersecting point can be used both in longitudinal and lateral attachments. If the assembly of the laterally attached main and subsidiary apparatuses is placed on a horizontal surface, such as a desk top, the input panel tilts at a predetermined angle as in longitudinal attachment.

Detachment can be performed substantially in the same manner as detachment from longitudinal attachment, that is, by relatively moving the main apparatus from the subsidiary apparatus while the release button 606 of the subsidiary apparatus is being pressed down so as to lower the stopper knob 604. Then, the main apparatus is relatively moved depthwise from the subsidiary apparatus so as to release the guide pins 608a, 608b from the guide recesses 513c, 513d, thus completing the detachment procedure.

During the above described attachment and detachment procedures, the projection 601a of the subsidiary apparatus can be used as a positional reference to move the main apparatus relatively to the subsidiary apparatus. Further, the projection 601a can be used as a hold or handle, thereby facilitating the attachment and detachment procedures.

Figure 13:
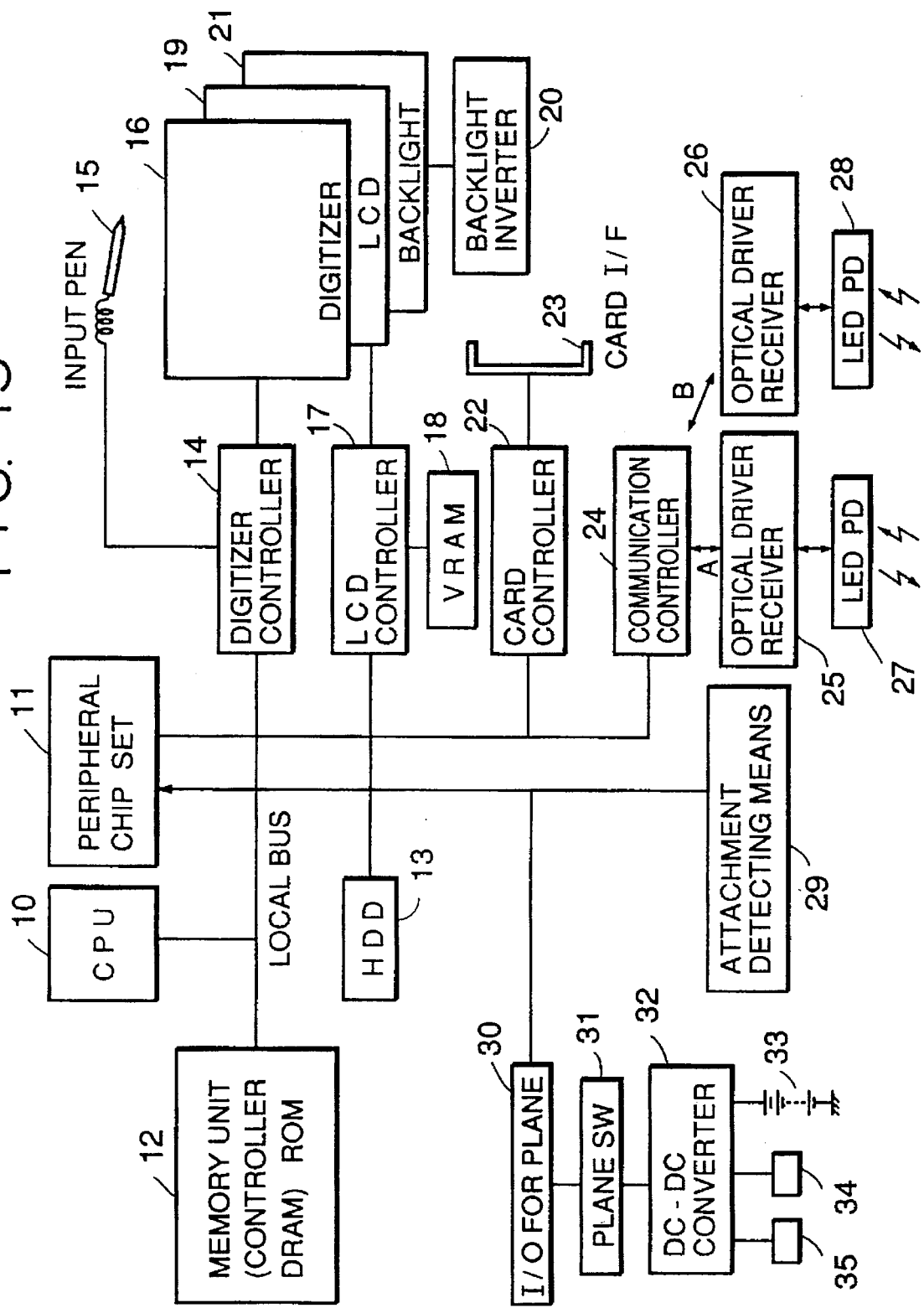
FIG. 13 is a block diagram illustrating the overall construction of the first embodiment.

The overall electrical construction of the information apparatus will be described with reference to FIG. 13. A CPU 10 is a 32-bit CPU, for example, i80386SL by Intel, and executes various programs, such as arithmetic operation and I/O control. A peripheral chip set 11 operates in combination with the CPU 10 and performs various I/O controls required for a peripheral, for example, I/O controls of serial communication, parallel communication, a real time clock, a timer, interruption control and DMA control. A memory unit 12 comprises various memories, such as a main memory (a DRAM of 8 MB), a cache (64 KB) and a bootstrap ROM. The main memory is backed up when suspended. The memory stores control procedure to be executed by the CPU 10. An HDD 13 includes a 1.8 or 1.3-inch hard disk having a capacity of 20–80 MB for storing an OS, application software, user's data, etc.

In the pen-base computer of this embodiment, data is inputted by moving the input pen 15 on the digitizer just like writing or drawing on a sheet of paper. The trace of the input pen 15 or result of input is displayed on the LCD (liquid crystal display) 19. The digitizer 16 is lain over the LCD 19 so that an input substantially coincides in position and time with the corresponding output. The input positional accuracy of the digitizer 16 is finer than one dot of the LCD 19. For example, the accuracy is about 0.1 mm. A digitizer control unit 14 controls the digitizer 19. Although the interior of the digitizer control unit 14 is not shown in the figure, the digitizer control unit 14 comprises a CPU, a ROM, a RAM and a driver. An LCD controller 17 sequentially accesses to display data stored in a VRAM 18 and transfers to the LCD 19 the data considering tones and the like. The LCD controller 17 also performs bus control so as to prevent collision between an access from the CPU 10 to the VRAM 18 and an access to data to be transferred to the LCD 19. Further, the LCD controller 17 is able to perform logical operation, such as AND, OR, EXOR, etc., of the content of the VRAM 18 with predetermined data (for example, a VGA controller). A backlight 21 is an assembly of light emitters provided behind the LCD 19 so as to make display visible even in a dark place. The backlight 21 may be of EL (electroluminescense) type, CFL (cold-cathode fluorescent light) type, etc. A backlight inverter 20 drives the backlight 21.

A card interface 23 is connectable to various memory cards such as a ROM card for adding an application program or data, a RAM card to be used as an extended memory or a backup memory, or a flash card for backing up or adding data, and various I/O cards, such as a facsimile data modem card for data communication through a telephone line, or a LAN card for connecting to a network. The card interface 23 may be a standard interface having 68 pins according to JEIDA/PCMCIA. A card controller 22 performs controls (for example, address change) for writing data from the CPU into a card or reading data from a card.

A communication controller 24 performs control of data communication by the SDLC scheme. A channel A is used for data communication with node devices (subsidiary apparatuses), such as a keyboard, a floppy disk drive, or a centronics device. A channel B is used for communication with a network, such as Local Talk, via a subsidiary apparatus. The channels A, B are provided with optical driver-receivers 25, 26 and LED-PD units 27, 28, respectively. A DC—DC converter 32 converts a source voltage supplied from one of a battery 33, an AC adapter jack 34 or a electrodes 35 for connecting to a subsidiary apparatus, into voltages required by the main apparatus (for example, +5 V for logic, +12 V for the backlight, −24 V for the LCD).

Figure 14:
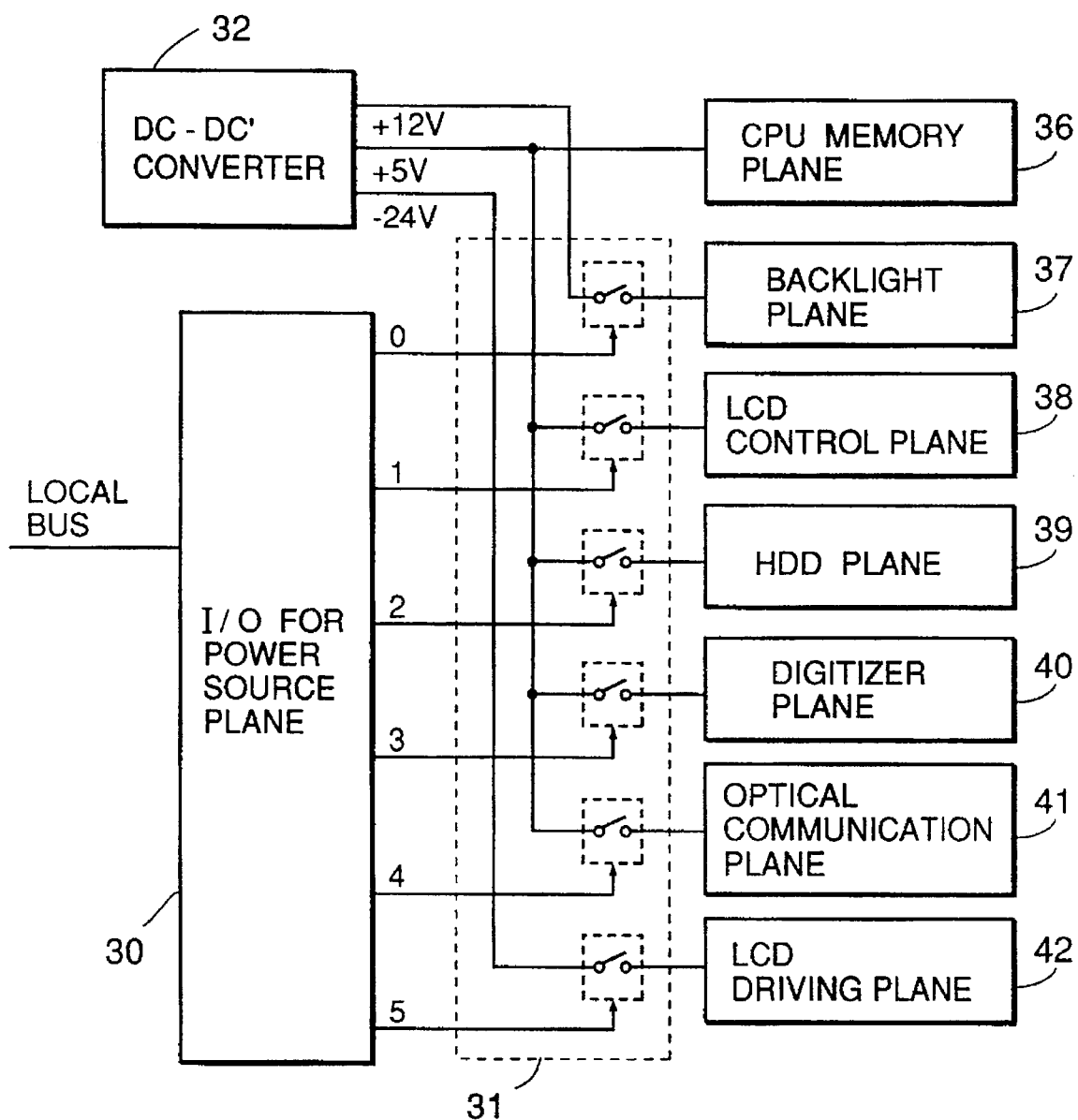
FIG. 14 illustrates a power source controller of the first embodiment.

The power source control will be described in detail with reference to FIG. 14. Electrical portions of the main apparatus are divided into power source planes in accordance with the functions thereof. The power source planes can be individually switched on and off, except a CPU memory plane 36. The CPU memory plane 36 remains on once the apparatus is powered on. The CPU plane 36 includes the CPU 10, the peripheral chip set 11, a memory unit 12, and a plane I/O 30. A backlight plane 37 is a plane for the backlight inverter 20 and supplied with a voltage of +12 V. An LCD control plane 38 includes the LCD controller 17 and the VRAM 18. An HDD plane 39 includes the HDD 13. A digitizer plane 40 includes the digitizer control unit 14, the digitizer 16 and the input pen 15. An optical communication plane 41 includes the communication controller 24, the optical driver-receivers 25, 26, the LED-PD units 27, 28. These planes are supplied with a voltage of +5 v. An LCD driving plane 42 is a power source plane for generating divided voltages for actually driving the LCD 19. The LCD driving plane is supplied with −24 V. These planes are switched on and of as follows. When the CPU 10 writes data, that is, ON (or HIGH) or OFF (LOW), into the power source plane I/O 30 mapped at a certain I/O address, plane switches 31 accordingly performs switch on/off operation. The plane switches 31 may be mechanical-electrical devices, such as electromagnetic relays or lead switches, or a semiconductor switch employing FETs.

Figure 15A:
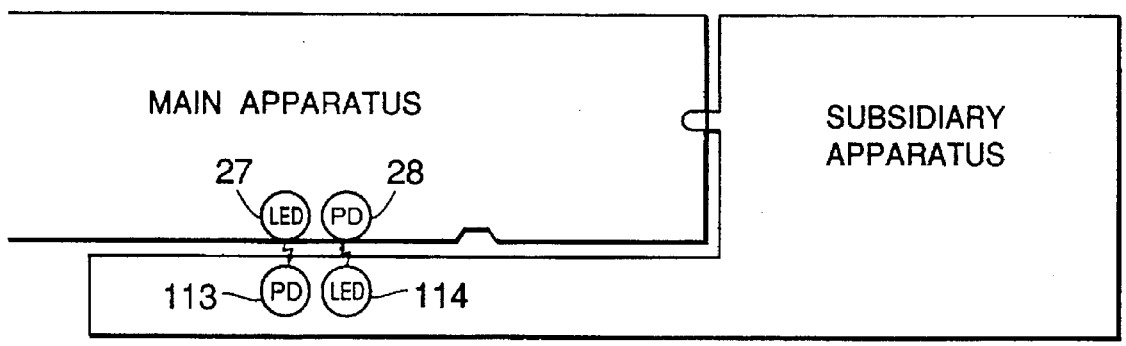
FIG. 15(a) and 15(b) illustrates attachment detecting means of the first embodiment.
Figure 15B:
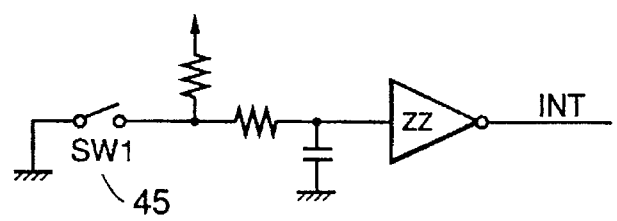

FIGS. 15(a) and 15(b) illustrate an example of the attaching-detecting means. FIG. 15(a) is a sectional view of the attached main and subsidiary apparatuses. Attachment or detachment is detected on the basis of the status of the switch of the main apparatus, that is, whether the switch is pressed by the hook portion 603 of the subsidiary apparatus. The detection result is sent to the CPU 10 via a circuit shown in FIG. 15(b). The result is sent to the CPU 10 by interruption INT, and the status thereof can be monitored by means of an I/O (not shown).

When the main and subsidiary apparatuses are attached, the optical communication LEDs and PDs face each other through the channels A, B (only one channel is shown in the figure), thereby performing non-contact communication. Further, the electrodes 119 of the subsidiary apparatus contact the electrodes 35 of the main apparatus, thereby enabling power supply.

Figure 16:
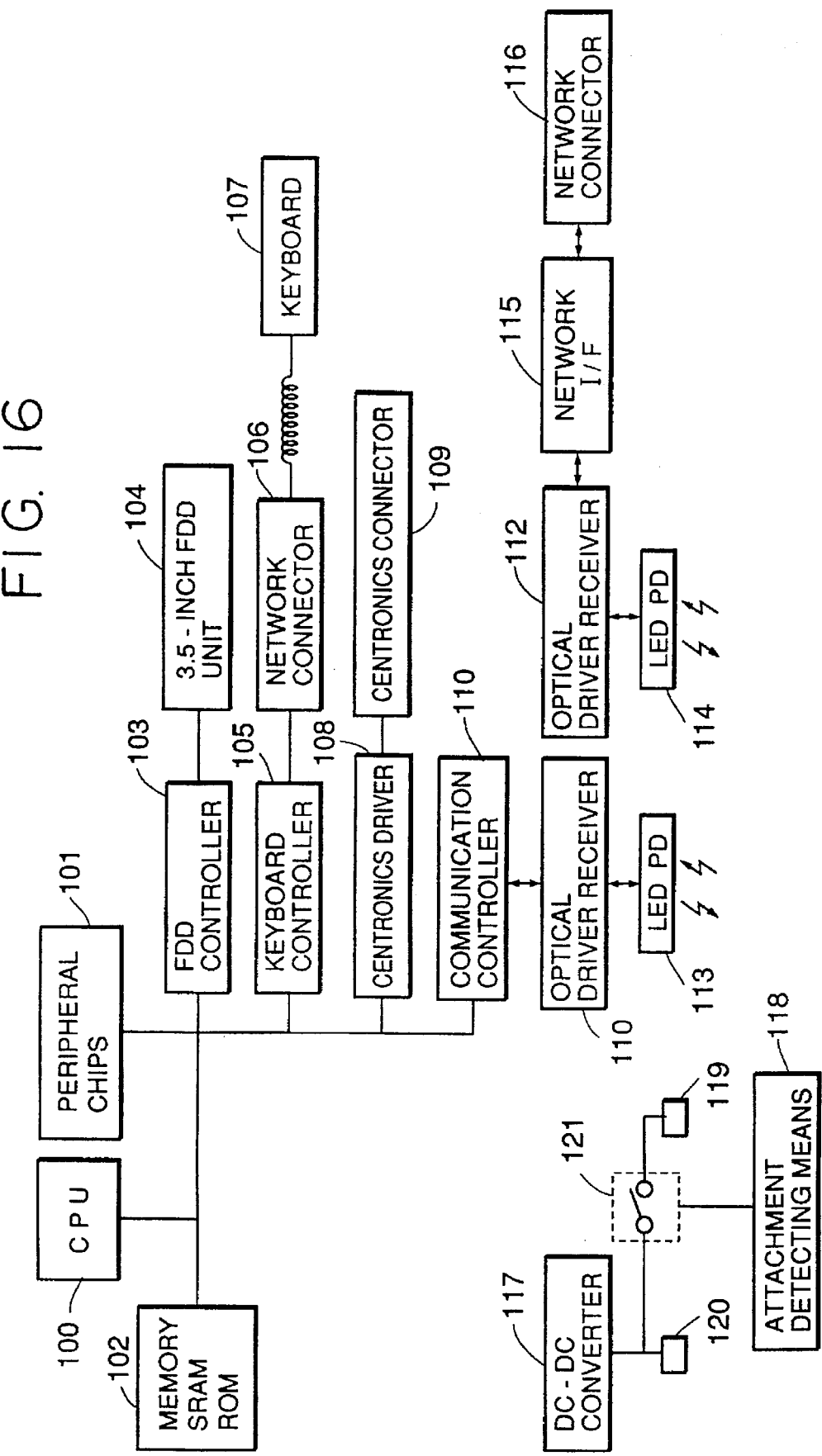
FIG. 16 is a block diagram of subsidiary apparatus of the first embodiment.

FIG. 16 is a block diagram of electrical portions of the subsidiary apparatus.

A combination of CPU 100, peripheral chips 101 and a memory 102 performs the overall electrical control. The subsidiary apparatus comprises devices that are not provided in the main apparatus, that is, a floppy disk drive (FDD), a keyboard, a centronics interface and a network interface.

An FDD controller 103 is an IC for controlling a 3.5-inch FDD unit 104. A keyboard controller 105 informs the CPU 100 which key has been pressed. The data inputted by means of the FDD or the keyboard is sent to the main apparatus via a communication controller 110. A centronics driver 108 is an interface for outputting the data from the CPU 100 to a printer or the like. The communication controller 110, optical driver-receivers 111, 112 and LED-PD units 113, 114 are substantially the same as those in the main apparatus.

A network interface 115 achieves a voltage and an impedance suitable for connection to a network. In this embodiment, it directly outputs signals from the channel B of the main apparatus.

A DC—DC converter 117 is a power source of the subsidiary apparatus and supplied with electricity from an AC adapter jack 120. Attachment detecting means 118, substantially the same as described above, connects a switch 121 when detecting attachment, thereby supplying electricity to the electrodes 119 of the subsidiary apparatus which contact the electrodes 35 of the main apparatus.

Figure 17:
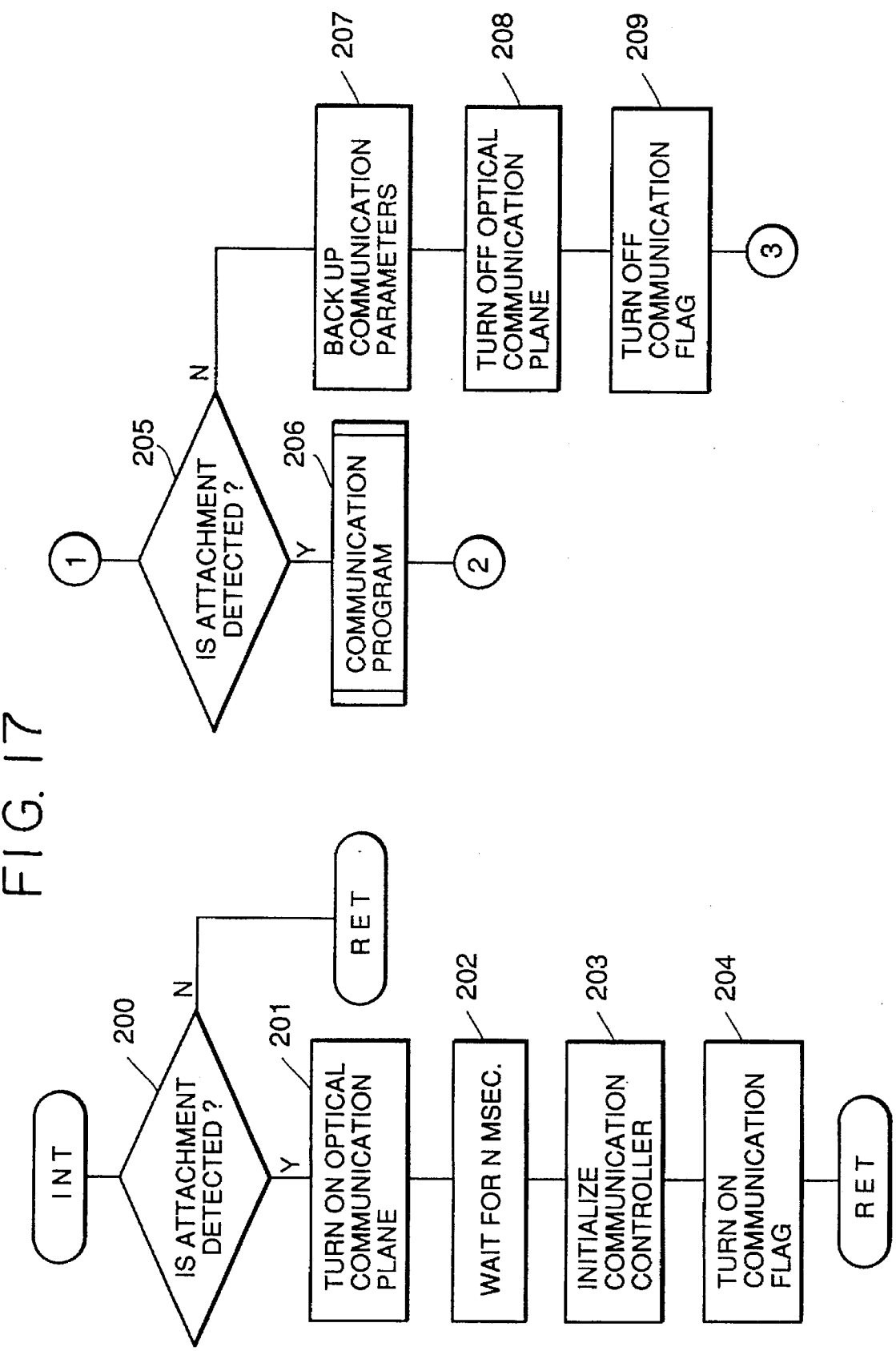
FIG. 17 is a flowchart of an operation in connection with turning on and off of an optical communication plane.

FIG. 17 is a flowchart regarding the on/off operation of the optical communication plane of this embodiment. When the subsidiary apparatus is attached to the main apparatus, an interruption signal for interrupting CPU 10 is generated as shown in the circuit diagram of FIG. 15(b). When the interruption routine is started, the status of the attachment detecting switch is confirmed in Step 200. If attachment is confirmed, the optical communication plane is switched on in Step 201. More specifically, the fourth bit in the power source plane I/O 30 is made HIGH to switch on the switch 31. In Step 202, the operation waits for N msec. until the power becomes stable. In Step 203, the communication controller 24 is initialized. In Step 204, the communication flag is turned on. The interruption routine is thus completed. In normal operation, only when the communication flag is on, the polling in which calling is periodically repeated or the selecting in which calling is performed only when necessary is performed. In Step 205, the status of the attachment detecting switch is confirmed. If attachment is confirmed, the communication routine is started in Step 206. If it is not confirmed, the operation goes to Step 207, where parameters and the like needed for communication are backed up. Then, the optical communication plane is switched off in Step 208, and the communication flag is turned off in Step 209, thus completing the operation.

After the above operation, the communication routine is initiated only when the communication flag is turned on by the interruption routine.

Although not shown in the figure, when the power is on, the status of the attachment detecting switch is checked during the power source initialization. If attachment is confirmed, the following operations are performed: switching on the optical communication plane, initializing the communication controller, and switching on the communication flag.

Next described will be various ways of using the information apparatus constructed as described above.

First, the main apparatus can be used without connecting it to the subsidiary apparatus. The main apparatus can be used in any of the four directional placement with respect to the user or any inputting-displaying direction. The display panel of the LCD 19 is shifted from one inputting-displaying direction to another by the following procedure. When a predetermined piece of information inputted by the input pen 15 is sent to the CPU 10, the CPU 10 determines the displaying direction based on the information. In accordance with the thus-determined display direction, the CPU 10 rewrites the data stored in the VRAM 18 by means of the LCD controller 17. Then, the LCD controller 17 causes the LCD 19 to display the data stored in the VRAM 18, thus achieving a displaying direction shift. Thereby, data can be inputted by the input pen 15 in various manners.

When the main apparatus is used either alone or in combination with a subsidiary apparatus, it should be convenient for a right-hander operator to have the connecting cord 509 of the input pen 15 running at the right-hand side, and for a left-hander operator to have it at the left-hand side. In such a manner, the connecting cord 509 will not interfere with the input operation of the operator. According to this embodiment, the main apparatus has: a gap between the input pen holder 506 and the adjacent side wall in which the connecting cord 509 can be rolled; and grooved portions 515a–515d provided on the bottom surface thereof adjacent to the four corners into which the cord 509 can be hooked. Thus, by pulling out the cord 509 from the gap and hooking it one or more of the grooved portions 515a–515d, the cord 509 can be placed so as not to interfere with input operation in any directional placement of the main apparatus.

Figure 12:
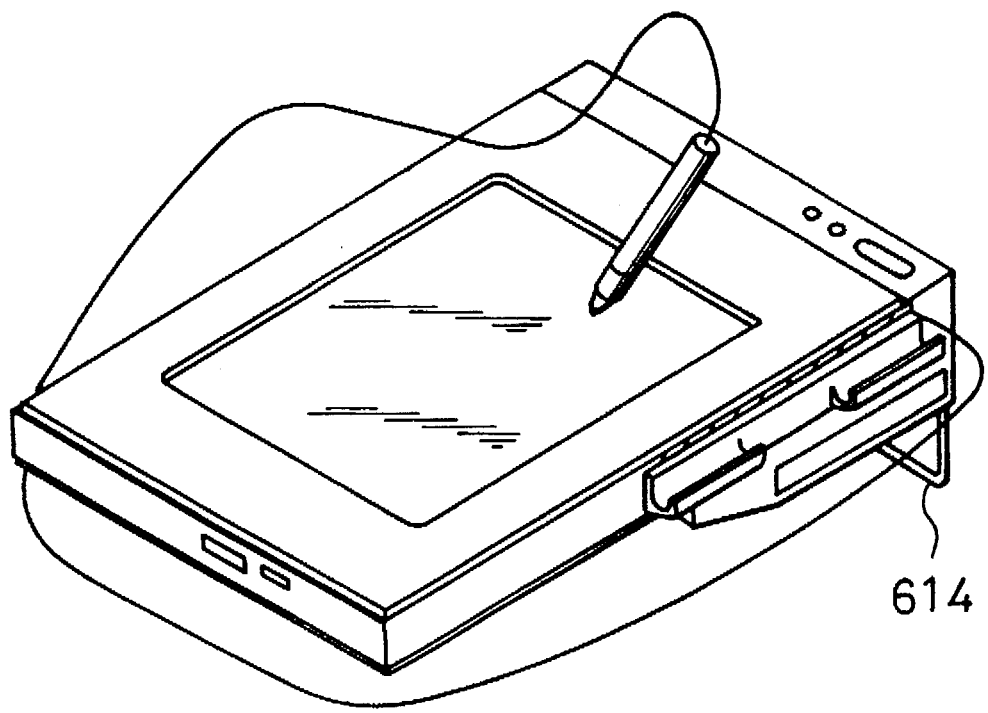
FIG. 12 illustrates the placement of the first embodiment when a stand is used.
Figure 20:
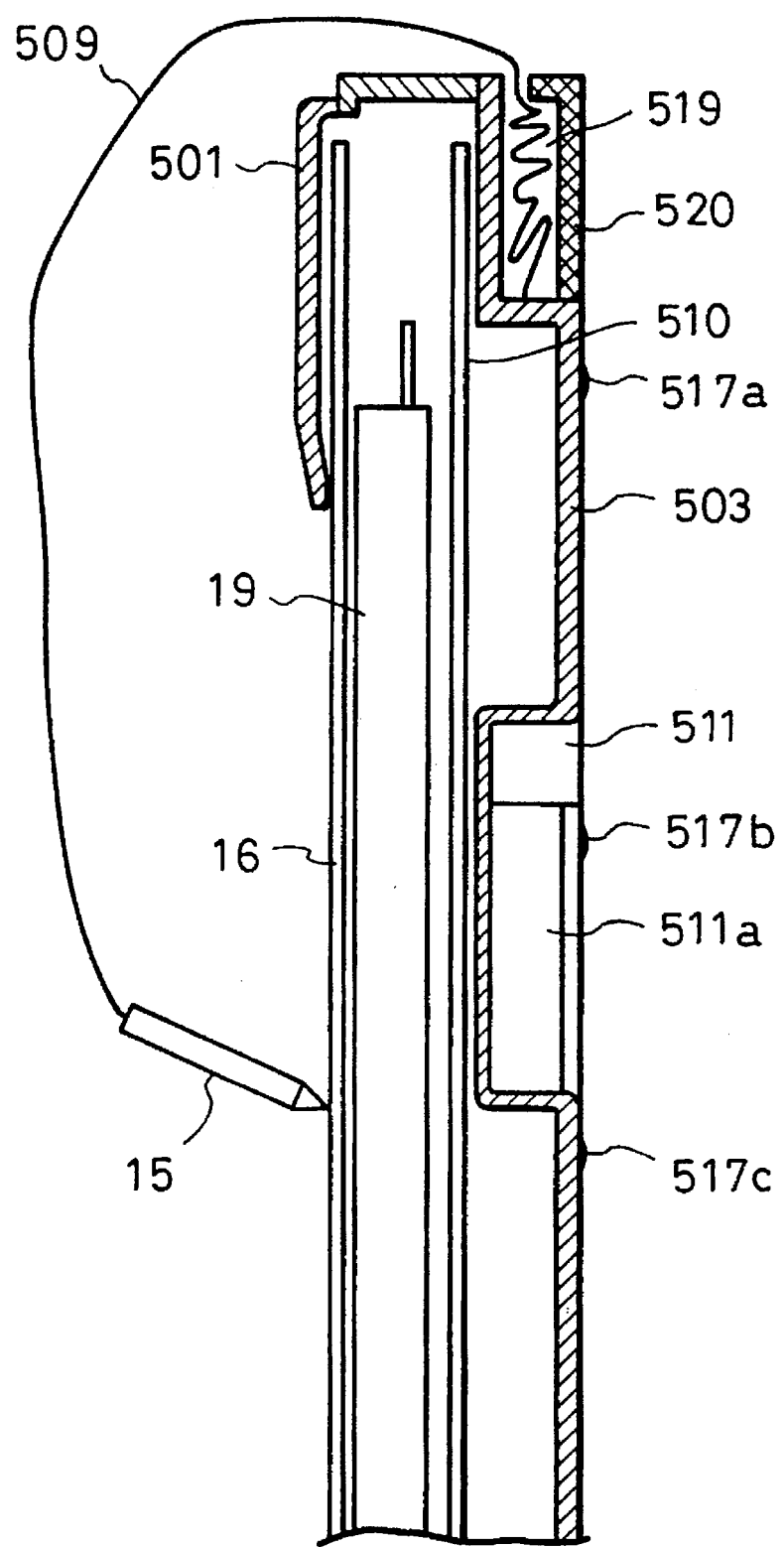
FIG. 20 is a sectional view of the main body shown in FIG. 18.
Figure 20A:
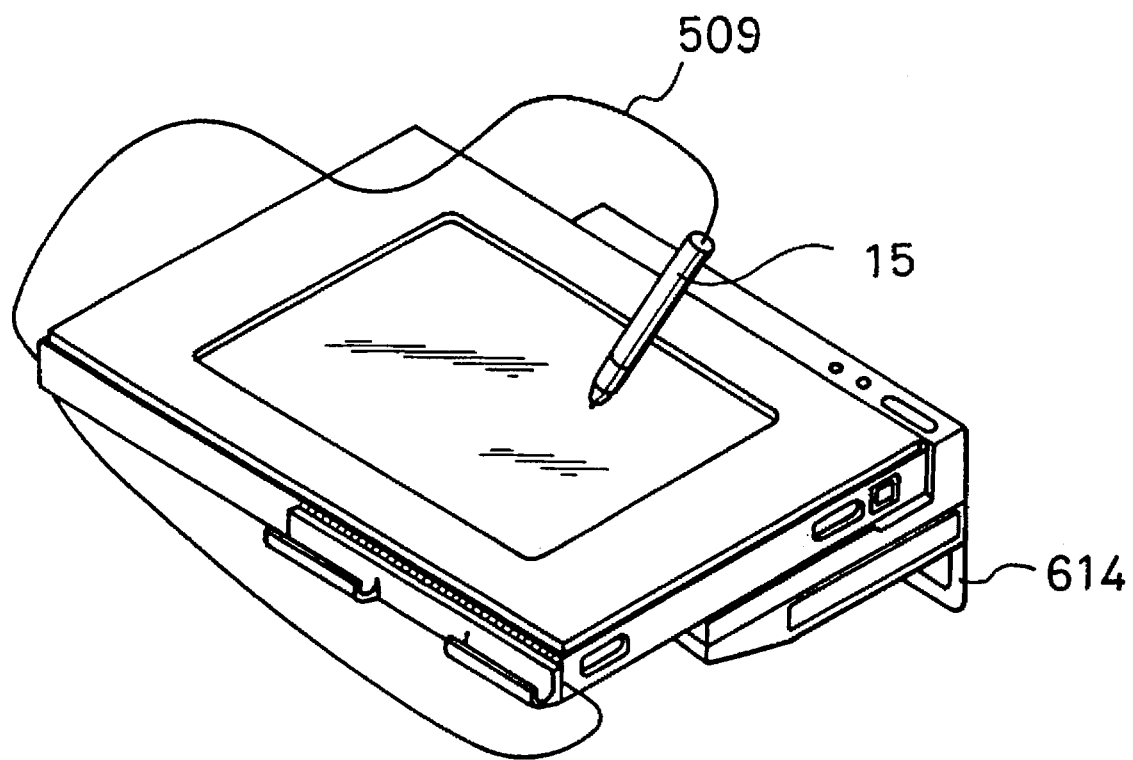
FIG. 20A is a perspective view of the second embodiment in the wide-view attachment when a stand is used.

Second, the ways of using the attached main and subsidiary apparatuses will be described. No matter whether the main and subsidiary apparatuses are in lateral or longitudinal attachment, the subsidiary apparatus underlies the main apparatus adjacent to a side of the main apparatus. Further, the subsidiary apparatus is provided with a rubber foot 612a. Thereby, the assembly of the attached main and subsidiary apparatuses can be placed so that the input panel is tilted toward the user, that is, the close side of the input panel is relatively low and the remote side is relatively high. Thus, the input panel is easy to write on with the input pen 15, and the display panel of the LCD 19 is easy to see. In addition, in either of the attachments, the assembly can be used in the upright standing placement with the above-mentioned remote-side surface of the subsidiary apparatus being the bottom surface. FIG. 12 illustrates a standing placement of the longitudinally attached main and subsidiary apparatuses. FIG. 20 illustrates a standing placement of the laterally attached main and subsidiary apparatuses. When the main and subsidiary apparatuses in either of the attachments is shifted to standing placement from lying placement, the image displayed on the LCD 19 is inverted. In either of the standing placements, the attached main and subsidiary apparatuses can be stabilized by turning the stand 614 to a predetermined position. The standing placements are convenient when a keyboard or the like connected to the subsidiary apparatus is used, in which case the input/display panel is used simply as a display panel. However, the standing placements also allow inputting by means of the input pen 15.

According to this embodiment, because the electrode pins for achieving electrical connection are always covered with the covers when the apparatuses are detached from each other, the electrode pins can be kept clean and free from dust even when the apparatuses are being carried. Further, because the covers are opened and the electrode pins are unfailingly connected substantially automatically by movements involved in the attachment procedure, the information apparatus of this embodiment is easy to use, requiring no connecting cord between the main and subsidiary apparatuses and no operation for attaching and detaching a cover for electrode pins.

Although, in this embodiment, the cover means is provided in the main apparatus, cover means may also be provided in the subsidiary apparatus or both apparatuses, according to the present invention.

[Second Embodiment]

Figure 18:
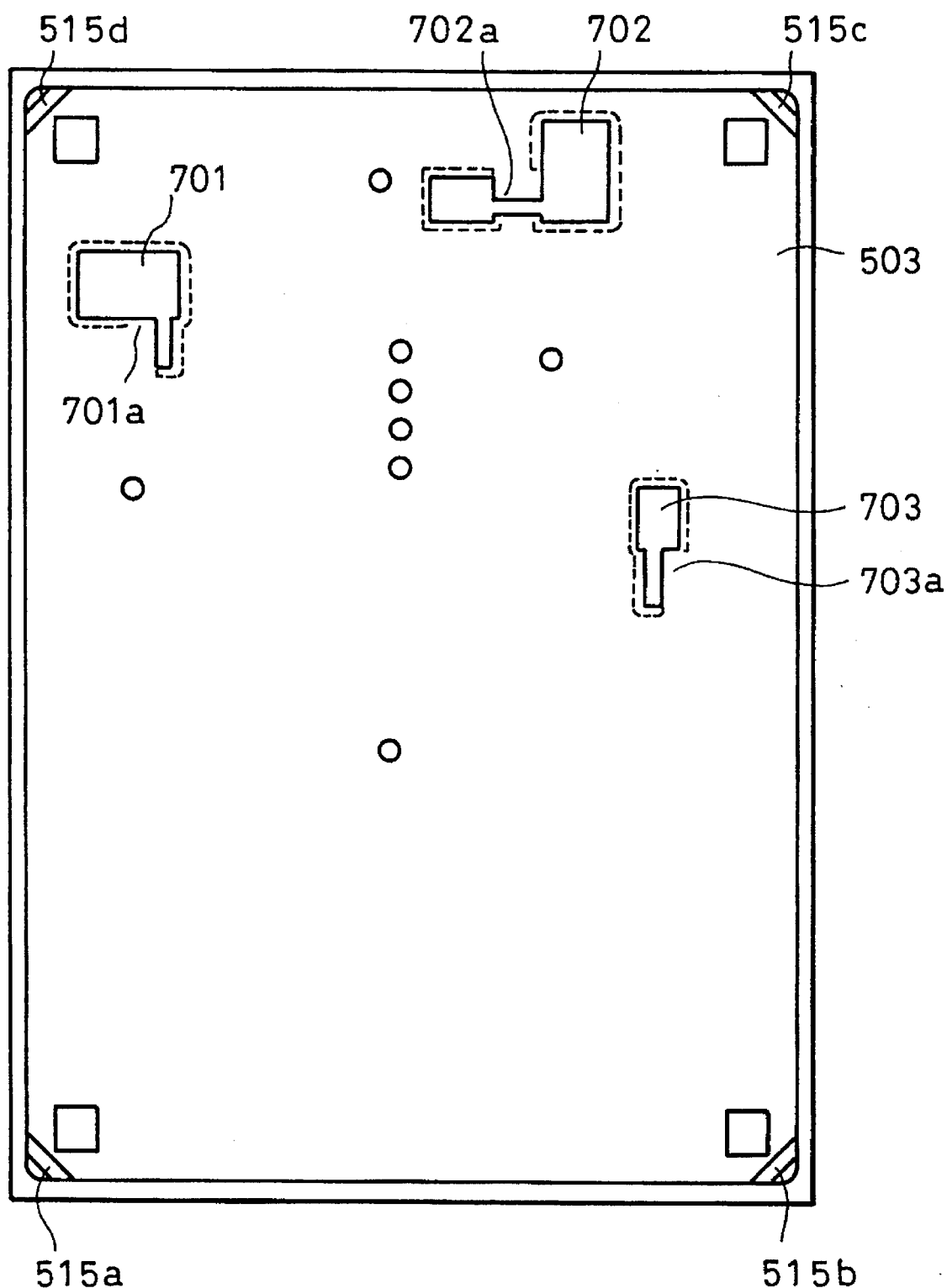
FIG. 18 is a bottom plan view of a main body of the second embodiment of the information apparatus of the present invention.
Figure 19:
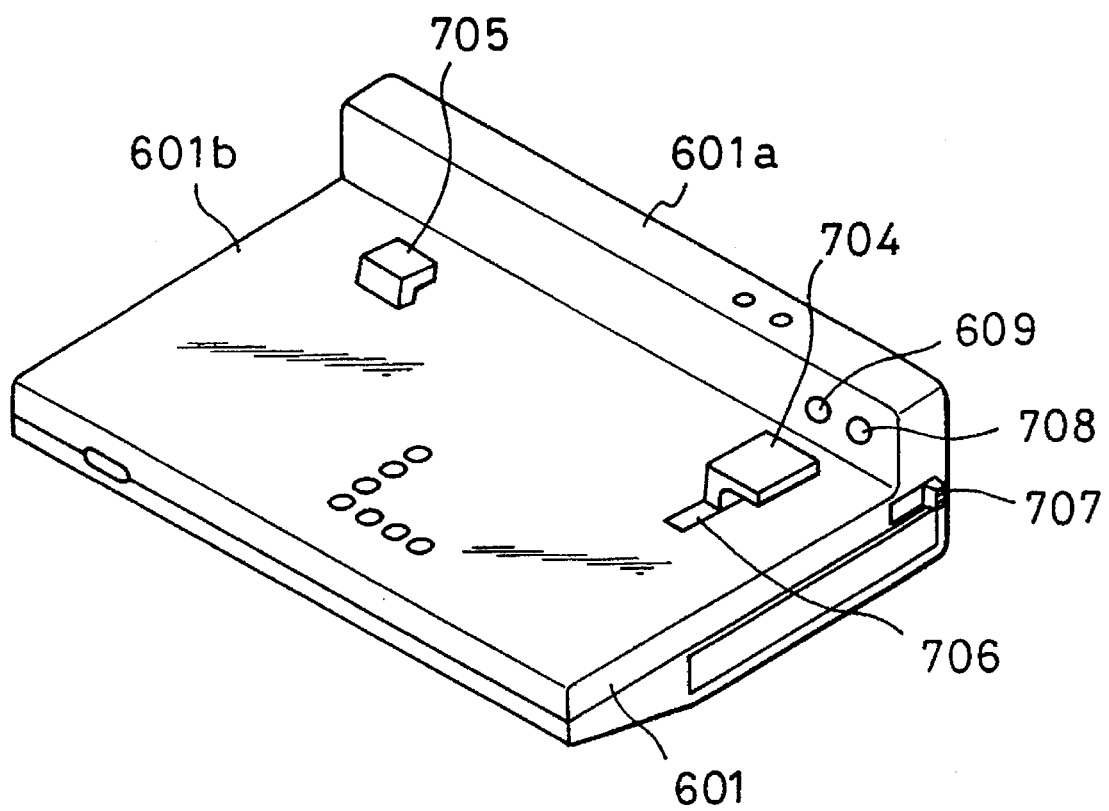
FIG. 19 is an perspective exterior view of a subsidiary apparatus of the second embodiment.

A second embodiment of the present invention is illustrated in FIGS. 18 and 19. FIG. 18 is a bottom plan view of a main apparatus according to this embodiment. FIG. 19 is a perspective exterior view of a subsidiary apparatus of this embodiment.

As shown in FIG. 18, a bottom casing 503 of the main apparatus is provided with three recesses 701, 702, 703 which form part of the means for attaching to the subsidiary apparatus. The recesses 701–703 are provided with hook receiving portions 701a–703a, respectively, into which hook portions provided in the subsidiary apparatus are inserted to achieve attachment of the main and subsidiary apparatus. The recesses 701 and 702 are used for longitudinal attachment, and the recesses 702 and 703 are used for lateral attachment. The positional relation among the three recesses 701–703 is defined as follows. The hook receiving portion 701a would substantially coincide with the hook portion 702a if the hook receiving portion 701a were rotated substantially 90° clockwise about the intersecting point of two straight lines extending from the right and left-hand vertexes, respectively, of the shorter side of the main apparatus adjacent to the longitudinally attached subsidiary apparatus, at substantially 45° with respect to the above-mentioned shorter side. The hook receiving portion 702a would substantially coincide with the hook receiving portion 703a by rotating the hook receiving portion 702a substantially 90° clockwise about the above-defined intersecting point. The hook receiving portions 701a–703a each have a plate spring (not shown) provided inside thereof. None of the hook receiving portions 701a–703a have any electrode provided therein.

Referring to FIG. 19, a top surface 601b of a top casing 601 of the subsidiary apparatus is provided with two "L"-shape hook portions 704, 705 each formed of a base portion extending substantially upright from the top surface 601b and a top portion extending therefrom substantially parallel to the top surface 601b. The top portion of the hook portion 705 extends from the base portion toward a projection 601a provided along a side of the top surface 601b. The top portion of the hook portion 704 extends from the base portion to the right when the subsidiary apparatus is viewed with the projection 601a positioned relatively remote from the viewer. The right-hand side wall of the top casing 601 is provided with an attachment lever 707 which is movable substantially parallel to the right-hand side of the top surface 601. The hook portion 704 can be shifted along the depth, that is, substantially parallel to the right-hand side by operating the attachment lever 707 in association with a shifting mechanism or the like (not shown).

An power supply plug 708 and an operating pin 609 for the attachment detecting switch are provided in the inner side wall of the projection 601, adjacent to the right-hand end of the projection 601. The power supply plug 708 is connected to the attachment lever 707 so as to be projectile from the inner side wall of the projection 601a by operating the attachment lever 707.

The remaining construction of the second embodiment is generally the same as in the first embodiment.

Attaching/detaching means of the main and subsidiary apparatuses will be described.

The means and procedure for achieving longitudinal attachment will be described. First, the main apparatus is placed on the top surface 601a of the subsidiary apparatus so that the remote side of the main apparatus is adjacent to the inner side surface of the projection 601 of the subsidiary apparatus, and that the right-hand side surface of the main apparatus is a predetermined distance deviated from the right-hand surface of the subsidiary apparatus. By this placement, the hook portions 704, 705 of the subsidiary apparatus are positioned inside the recesses 701, 702, respectively, of the bottom of the main apparatus. Second, the main apparatus is moved relatively to the subsidiary apparatus to the right or left so as to insert the hook portion 705 of the subsidiary apparatus into the hook receiving portion 702. Thereby, the main and subsidiary apparatuses are urged onto each other along their thickness by the plate spring (not shown) provided in the hook receiving portion 705. Then, the attachment lever 707 is shifted toward the closer side (front side) so as to insert the hook portion 704 into the hook receiving portion 701a. Thereby, the main and subsidiary apparatuses are urged onto each other along their thickness by the plate spring (not shown) provided in the hook receiving portion 704. The position of the main and subsidiary apparatuses with respect to the right-left directions is defined by abutment between the upright base portion of the hook portion 704 and a surface in the recess 701 facing the upright base portion. The position of the main and subsidiary apparatuses with respect to the depthwise directions is defined by abutment between the upright base portion of the hook portion 704 and a surface in the recess 702 facing the upright base portion. Further, the power supply plug 708 is projected from the inner side wall of the projection 601a in association with the shifting of the attachment lever 707, and inserted into a first power supply jack (not shown) provided in the corresponding portion of the main apparatus. The main and subsidiary apparatuses are thus attached easily without a failure.

The means and procedure for detaching the longitudinally attached main and subsidiary apparatuses will be described. By shifting the attachment lever toward the remote side, the hook portion 704 and the power supply plug 708 are released from the hook receiving portion 701a and the power supply jack. Then, the main apparatus is moved to the left or right relatively to the subsidiary apparatus. Thus, the main and subsidiary apparatuses are easily separated from each other.

Next described will be the means and procedure for achieving lateral attachment, which is suitable for lateral placement with respect to an operator, and detachment of the laterally attached main and subsidiary apparatuses. The remote side of the laterally attached main apparatus corresponds to left-hand side of the longitudinally attached main apparatus. The right-hand side wall of the laterally attached main apparatus, which corresponds to the remote side wall of the longitudinally attached main apparatus, is substantially flush with the right-hand side wall of the subsidiary apparatus. In lateral attachment, the hook portions 704, 705 are inserted into the hook receiving portions 702a, 703a, respectively. The power supply plug 708 is inserted to a second power supply jack which is provided in the remote side wall of the laterally attached main apparatus facing the projection 601a, the remote side being positioned at the left side in longitudinal attachment. Detachment of the laterally attached main and subsidiary apparatuses can be carried out in generally the same manner as detachment of the longitudinally attached main and subsidiary apparatuses. By shifting the attachment lever toward the remote side, the hook portion 704 and the power supply plug 708 are released from the hook receiving portion 702a and the power supply jack. Then, the main apparatus is moved to the left or right relatively to the subsidiary apparatus. Thus, the main and subsidiary apparatuses can be easily separated from each other.

Similarly to the first embodiment, the projection 601a of the subsidiary apparatus according to the second embodiment can be used as a positional reference to shift main apparatus relatively to the subsidiary apparatus during the above described attachment and detachment procedures. Further, the projection 601a can be used as a hold or handle, thereby facilitating the attachment and detachment procedures.

According to the second embodiment, because the power supply plug, which forms part of the electrically connecting means, is contained in the casing when the subsidiary apparatus is separated from the main apparatus, the power supply plug can be kept clean and free from dust, and protected from accidental breakage. Further, because the power supply plug is inserted to the corresponding power supply jack by movements involved in the attachment procedure, the information apparatus of this embodiment is easy to use.

Although, in this embodiment, the power supply plug, that is the electrically connecting means of the subsidiary apparatus, is shifted in association with the shifting of the attachment lever, electrical connection between the main and subsidiary apparatuses can be achieved in other manners. For example, electrically connecting means is provided turnable on the bottom of the main apparatus, and a protruding member is provided on the subsidiary apparatus. While the main apparatus is moved relatively to the subsidiary apparatus to attach them, the electrically connecting means of the main apparatus is turned by abutting the protruding member so as to contact the electrically connecting means of the subsidiary apparatus.

The main apparatus of the second embodiment is further illustrated by the sectional view in FIG. 20. The bottom casing 503 is provided with a housing space 519 for housing the input pen cord 509. The housing space 519 has a lid 520 for facilitating housing the cord 509. Similar to the first embodiment, the main apparatus has grooved portions 515a–515d provided on the bottom surface thereof adjacent to the four corners into which the cord 509 can be hooked. Thus, by pulling out the cord 509 from the housing space 519, hooking it one or more of the grooved portions 515a–515d, and leading the cord 509 therefrom toward the input panel, the cord 509 can be placed so as not to interfere with input operation.

Optionally, means for rolling up the cord may be provided. More specifically, a rotatable roller is provided in the housing space 519, and a lever for rotating the roller is provided on the outside of the casing. Thereby, the cord can be easily housed in the housing space without having to open the lid 520. The operation for rolling up the cord 509 can be simplified by providing: a plate spring or the like for providing a force to rotate the roller; means for stopping rotation; and button or the like for controlling the roll-up operation.

Further, if the main apparatus employs a digitizer, such as a resistant film digitizer, that requires no electrical connection between the input pen 15 and the casing, the cord 509 is not needed or may be replaced by a wire or the like.

Still further, the grooved portions 515a–515d for receiving the cord 509 may be provided at positions other than the positions adjacent to the four corners of the bottom casing. For example, the grooved potions may be provided on the four corners of the intermediate casing 502.

[Other Embodiments]

Although the above-described embodiments each employs an ultrasonic-type digitizer as input means, other types of digitizers may be employed, for example, an electromagnetic induction digitizer, an electrostatic coupling digitizer, or a resistant film digitizer. Further, other types of input means may be employed, such as a keyboard.

Although the above embodiments each employs an LCD as display means, other types of displays may be employed, such as a plasma display, or an EL display.

The electrically connecting contacts of the electrically connecting means may be of any type or shape as long as it achieves predetermined electrical requirements.

Any attaching/detaching means other than the means described above may be employed as long as the means has a predetermined strength and is able to suitably position and fix the main and subsidiary apparatuses to each other. For example, the present invention may employ attaching/detaching means in which a hook portion provided in subsidiary apparatus is turned by operating a lever provided in the subsidiary apparatus so that the hook portion holds the bottom casing of the main apparatus.

The stand means may be provided on the bottom surface of the subsidiary apparatus. Further, the stand means may be constructed so that the stand means can be arranged at both sides of the attached main and subsidiary apparatuses so as to stabilize the apparatuses in the standing placement.

According to the present invention, a first casing and/or a second casing, that is, the main apparatus and/or the subsidiary apparatus, has cover means for covering the electrically connecting means movable in association with the attaching procedure. Because the electrically connecting means is covered by the cover means when the main and subsidiary apparatuses are separated from each other, the electrically connecting means can be kept clean and protected from accidental breakage caused by dust contamination, thereby achieving a highly reliable and safe information apparatus.

Further, according to the present invention, the electrically connecting means of the first casing and/or the electrically connecting means of the second casing is movable in association with the attaching procedure, more specifically, can be positioned inside the casing when the main and subsidiary apparatuses are separated. Thereby, a highly reliable and safe information apparatus can be achieved.

As described above, the information apparatus of the present invention comprises: a first casing having information inputting means for inputting information by using an input pen, display means, communication means and attaching means; and a second casing having communication means and attaching means, whereby the first casing and the second casing are attachable to each other, and wherein the first casing and/or the second casing has detaching means for detaching the first and second casings from each other. Because, when the first casing, that is, a main apparatus, and the second casing, that is, a subsidiary apparatus, are attached, the position of the subsidiary apparatus to the main apparatus can be selected in accordance with the inputting direction, the information apparatus of the present invention facilitates inputting information thereto.

Further, because the weight of the first casing can be reduced by providing the detaching means in the second casing, the information apparatus of the invention facilitates transporting the second casing.

Still further, if the second casing has retractable stand means, the attached first and second casings, that is, the attached main and subsidiary apparatuses, can be placed in such a posture so that the display panel is easy to see when a large amount of data is inputted by means of a keyboard connected to the information apparatus.

Further, if each of the communication means of the first and second casings comprises wireless communication means, such as optical communication means, or if one of the first and second casings comprises at least two pairs of power supply contacts and the other casing has a pair of power supply contacts, the information apparatus of the invention does not require a connecting cord for connecting the two casings. Thereby, the information apparatus of the invention significantly facilitates the inputting operation of a user, etc., without being disturbed by such a connecting cord.

Further, at least part of the attaching means can be provided on a bottom surface of the first casing so that, when the first and second casings are attached to each other, at least part of the second casing is positioned adjacent to the bottom surface of the first casing. Thereby, the input panel of the information apparatus is tilted toward an operator with the side of the input panel being relatively low and the remote side thereof being relatively high, thus further facilitating the inputting operation of the operator.

Still further, if the second casing has at least one surface which faces at least one side surface of the first casing when the first and second casings are attached to each other, and if at least a portion of the surface of the second casing forms guide means for attachment, the information apparatus of the invention significantly facilitates the attaching and detaching procedures.

Further, according to the present invention, the information apparatus comprises: a casing having an input panel; an input pen; connecting means for connecting the input pen to the casing, wherein the casing further has at least one hook portion into which a portion of the connecting means can be hooked. Thereby, the connecting means can be placed in a manner convenient for an operator, more specifically, at the right side if the operator is a right hander, and the left side if the operator is a left hander, regardless of the inputting direction. The information apparatus of the invention thus facilitates the inputting operation of a user.

[Third Embodiment]

The third embodiment of the present invention will be described hereinafter with reference to FIGS. 23–30.

Figure 23:
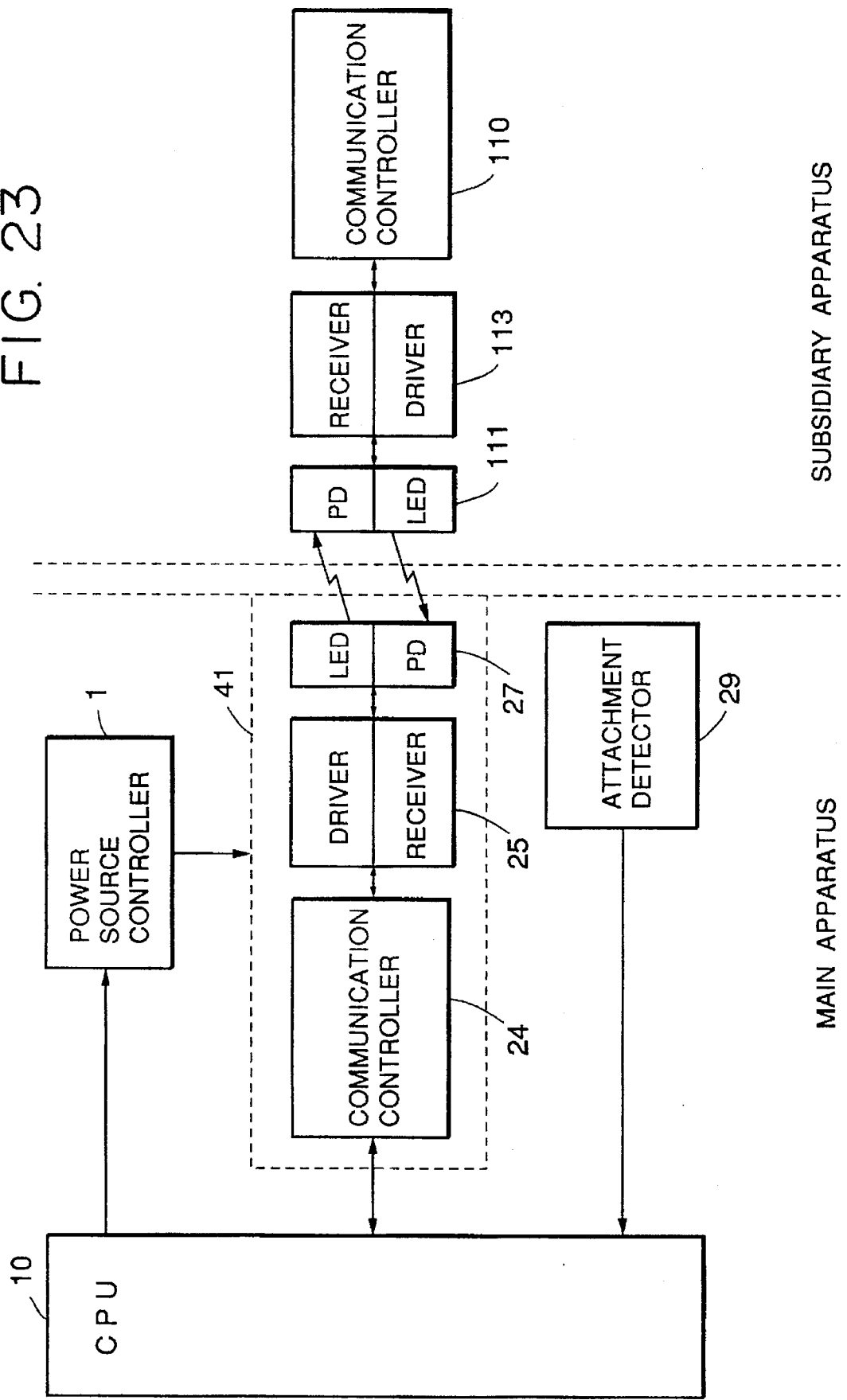
FIG. 23 is a schematic block diagram of the constructions of the main apparatus and the subsidiary apparatus of a third embodiment of the information apparatus of the present invention.

FIG. 23 is a schematic block diagram of the construction of an electronic appliance composed of main and subsidiary apparatuses according to this embodiment. The main apparatus is constructed as follows. A power source controller 1 comprises a DC—DC converter, a plane switch (SW), etc. The power source controller 1 switches on and off the power supplies to various sections of the electronic appliance, in accordance with an I/O instruction from a CPU 10. In the figure, the power source controller 1 switches on and off an optical communication power plane 41. The optical communication power plane 41 comprises: a communication controller 24; a light emitting-receiving unit (LED-PD unit) 27 including a light emitting element, such as an LED, and a PD (photodetector); and a driver-receiver 25. In accordance with a communication standard, such as RS232C or SDLC, the communication controller 24 converts data from the CPU via a bus into data and converts data from another communication apparatus into 8-bit data. An optical communication section of the subsidiary apparatus comprises a communication controller 110, a receiver-driver 113 and an LED-PD unit 111 which operate in generally the same manner as the communication controller 24, the driver-receiver 25 and the LED-PD unit 27 of the main apparatus. The main apparatus further comprises an attachment detector 29, specifically illustrated in FIG. 4, which detects attachment and detachment of the subsidiary apparatus. When the subsidiary apparatus is attached to the main apparatus, the attachment detector 29 informs the CPU of the attachment of the subsidiary apparatus by sending an interruption signal or an I/O (sense) signal. When the CPU 10 thereby detects the attachment of the subsidiary apparatus, it instructs the power source controller 1 to switch on the optical communication power plane 41. When the CPU 10 receives a signal from the attachment detector 29 indicating that the subsidiary apparatus has been detached from the main apparatus, the CPU 10 instructs the power source controller 1 to switch off the optical communication power plane 41.

Figure 24:
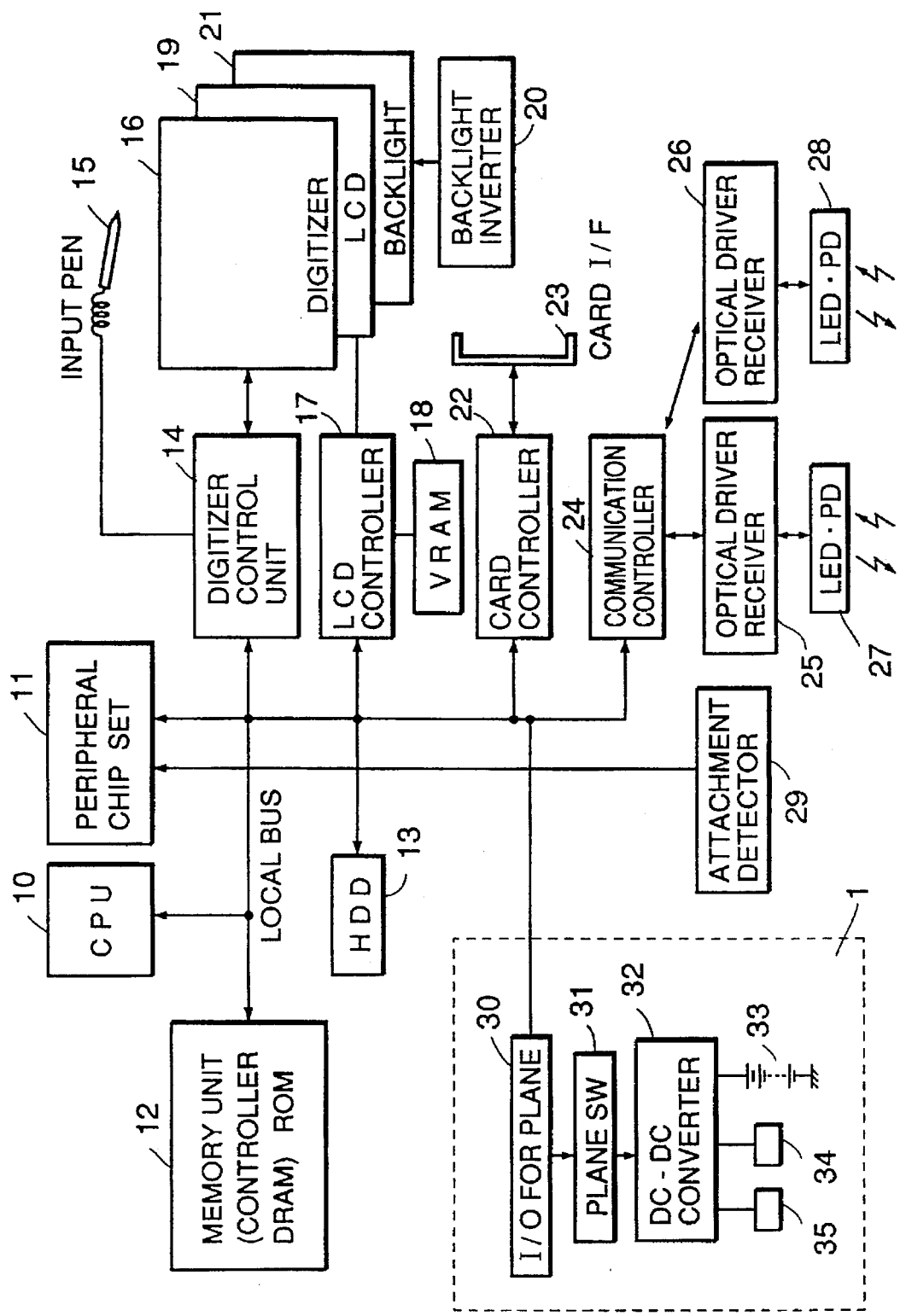
FIG. 24 is a schematic block diagram of the main body of the third embodiment.

FIG. 24 more specifically illustrates the construction of the electronic appliance. The components comparable to those in FIG. 23 are denoted by the same numerals and will not be described again.

The CPU 10 is a 32-bit CPU, for example, a microcomputer i80386SL by Intel, and executes various operations and programs, such as I/O control. A peripheral chip set 11 is an assembly of various control LSIs which operates in combination with the CPU 10 and performs various controls, for example, serial communication, parallel communication, a real time clock, programmable timer, interruption control and DMA control. A memory unit 12 comprises carious memories, such as a main memory (for example, an 8-Mbyte DRAM), a cache memory (64 Kbytes) and a bootstrap ROM. The main memory is backed up when suspended. An HDD 13 includes a 1.8 or 1.3-inch hard disk which stores an OS, application software, user's data, etc. The storage capacity is 20–80 Mbytes.

In the pen-inputting computer of this embodiment, data is inputted by moving an input pen 15 on the digitizer just like writing or drawing thereon. The trace inputted with the input pen 15 or result of character identification based on the trace is displayed on an LCD (liquid crystal display) 19. A digitizer 16 comprising transparent electrodes is lain over the LCD 19 so that an input substantially coincides with the corresponding output. The input positional accuracy of the digitizer 16 is finer than the display dot density of the LCD 19. The digitizer 16 is able to detect an input position in unit of, for example, about 0.1 mm. A digitizer control unit 14 controls, for example, detection of a coordinate input position to the digitizer 19. Although the interior of the digitizer control unit 14 is not shown in the figure, the digitizer control unit 14 comprises a CPU, a ROM, and a RAM driver. Various methods of inputting to the digitizer 16 may be employed, for example, an ultrasonic method, an electromagnetic induction method, an electrostatic coupling method, or a resistant film method.

An LCD controller 17 sequentially accesses to a video memory (VRAM) 18 storing display data, reads out the display data and transfers the data to the LCD 19 the data considering tones and the like. The LCD controller 17 also performs bus control so as to prevent collision between an access from the CPU 10 to the VRAM 18 and an access to data to be transferred to the LCD 19. Further, the LCD controller 17 is able to perform logical operation, such as AND, OR, EXOR, etc., of the data read out of the VRAM 18 and predetermined data (for example, a VGA controller). A backlight 21 is an assembly of light emitters provided in the LCD 19 so as to make display visible even in a dark place. The backlight 21 may be of EL (electroluminescense) type, CFL (cold-cathode fluorescent light) type, etc. A backlight inverter 20 drives the backlight 21.

A card interface (I/F) 23 is connectable to various memory cards such as a ROM card for adding an application program or data, a RAM card to be used as an extended memory or a backup memory, or a flash card for backing up or adding data, and various I/O cards, such as a facsimile data modem card for data communication through a telephone line, or a LAN card for connecting to a network, thus enabling the CPU 10 to access to the corresponding card. The card interface 23 may be a standard interface having a 68-pin arrangement according to JEIDA/PCMCIA. A card controller 22 performs controls (for example, address change) for writing data from the CPU into a card or reading data from a card.

A communication controller 24 performs control of data communication by the SDLC scheme. A channel A is used for data communication with subsidiary apparatuses, such as a keyboard, a floppy disk drive, or a centronics printer. A channel B is used for data communication with a network, such as Local Talk, via a subsidiary apparatus. The channels A, B are provided with optical driver-receivers 25, 26 and LED-PD units 27, 28, respectively.

The construction of the power source controller 1 will be described. A DC—DC converter 32 converts a source voltage supplied from one of a battery 33, an AC adapter jack 34 or an electrodes 35 for connecting to a subsidiary apparatus, into voltages required by the main apparatus (for example, +5 V for logic, +12 V for the backlight, −24 V for the LCD). The CPU 10 uses a plane I/O 30 to switch on and off plane switches (SW) 31, thus controlling the supply of the power outputted by the DC—DC converter 32 to the corresponding plane.

Figure 25:
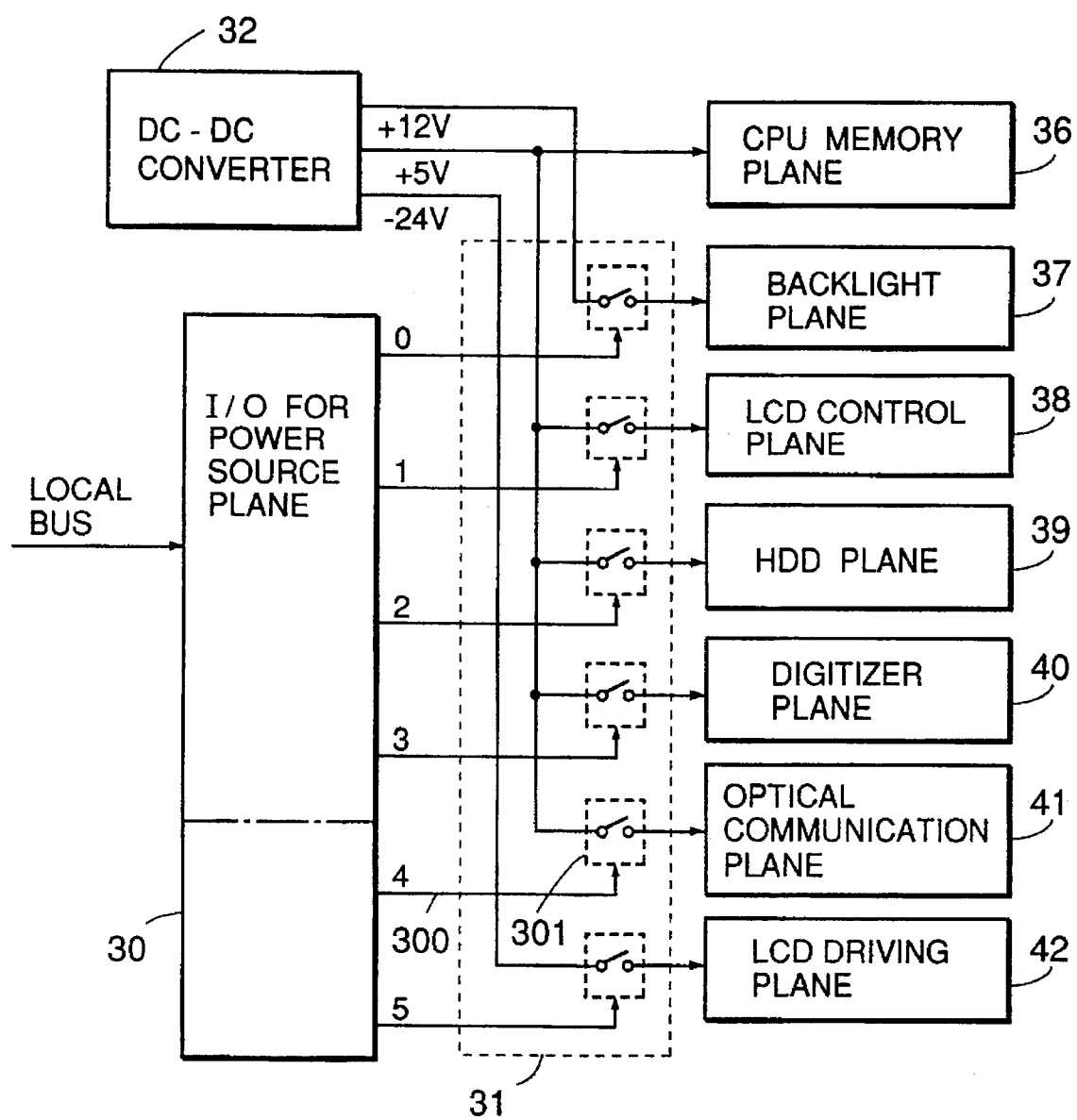
FIG. 25 is a block diagram of a power source controller of the main body.

FIG. 25 is a block diagram of the construction of the power controller 1. Electrical portions of the main apparatus are divided into power source planes in accordance with the functions thereof. The power source planes can be individually switched on and off, except a CPU memory plane 36. The CPU memory plane 36 remains on once the apparatus is powered on. The CPU plane 36 includes the CPU 10, the peripheral chip set 11, a memory unit 12, and the plane I/O 30. A backlight plane 37 is a plane for the backlight inverter 20 and driven by a source voltage of +12 V. An LCD control plane 38 includes the LCD controller 17 and the VRAM 18. An HDD plane 39 includes the HDD 13. A digitizer plane 40 includes the digitizer control unit 14, the digitizer 16 and the input pen 15. An optical communication plane 41 includes the communication controller 24, the optical driver-receivers 25, 26, the LED-PD units 27, 28. These planes are supplied with a voltage of +5 v. An LCD driving plane 42 is a power source plane for generating divided voltages for actually driving the LCD 19. The LCD driving plane is supplied with −24 V. These planes are switched on and of as follows. When the CPU 10 writes data, that is, ON (or HIGH) or OFF (LOW), into bits of the power source plane I/O 30 mapped at a certain I/O address, the corresponding plane switches 31 accordingly perform switch on/off operation. The plane switches 31 may be electrical devices, such as electromagnetic relays or lead switches, or semiconductor switches employing FETs.

FIG. 26(A) illustrates a main apparatus 50 and a subsidiary apparatus attached to each other. FIG. 26(B) illustrates the construction of an attachment detector for generating an interruption signal (INT) to the CPU 10 based on the status of a switch 45.

Referring to FIG. 26(A), the main apparatus 50 detects attachment of the subsidiary apparatus thereto when a projection 131 provided on the subsidiary apparatus 130 presses down the switch 45 provided in the main apparatus.

When the switch 45 is pressed down, an inverter circuit 400 having a hysteresis character outputs an interruption signal (INT) at a high level, thereby interrupting the CPU 10. However, if an output signal from the inverter circuit 400 is inputted to an I/O port of the CPU 10, the attachment status of the subsidiary apparatus 130 is detected without interrupting the CPU 10.

When the subsidiary apparatus 130 is attached to the main apparatus 50, an LED-PD unit 27 faces an LED-PD unit 111 through a channel A, and an LED-PD unit 28 faces an LED-PD unit 112 through a channel B, thereby performing non-contact communication using light. Further, electrodes 119 of the subsidiary apparatus 130 contact electrodes 35 of the main apparatus 50, thereby supplying power from an AC adapter jack 120 of the subsidiary apparatus 130 to the main apparatus 50.

Figure 27:
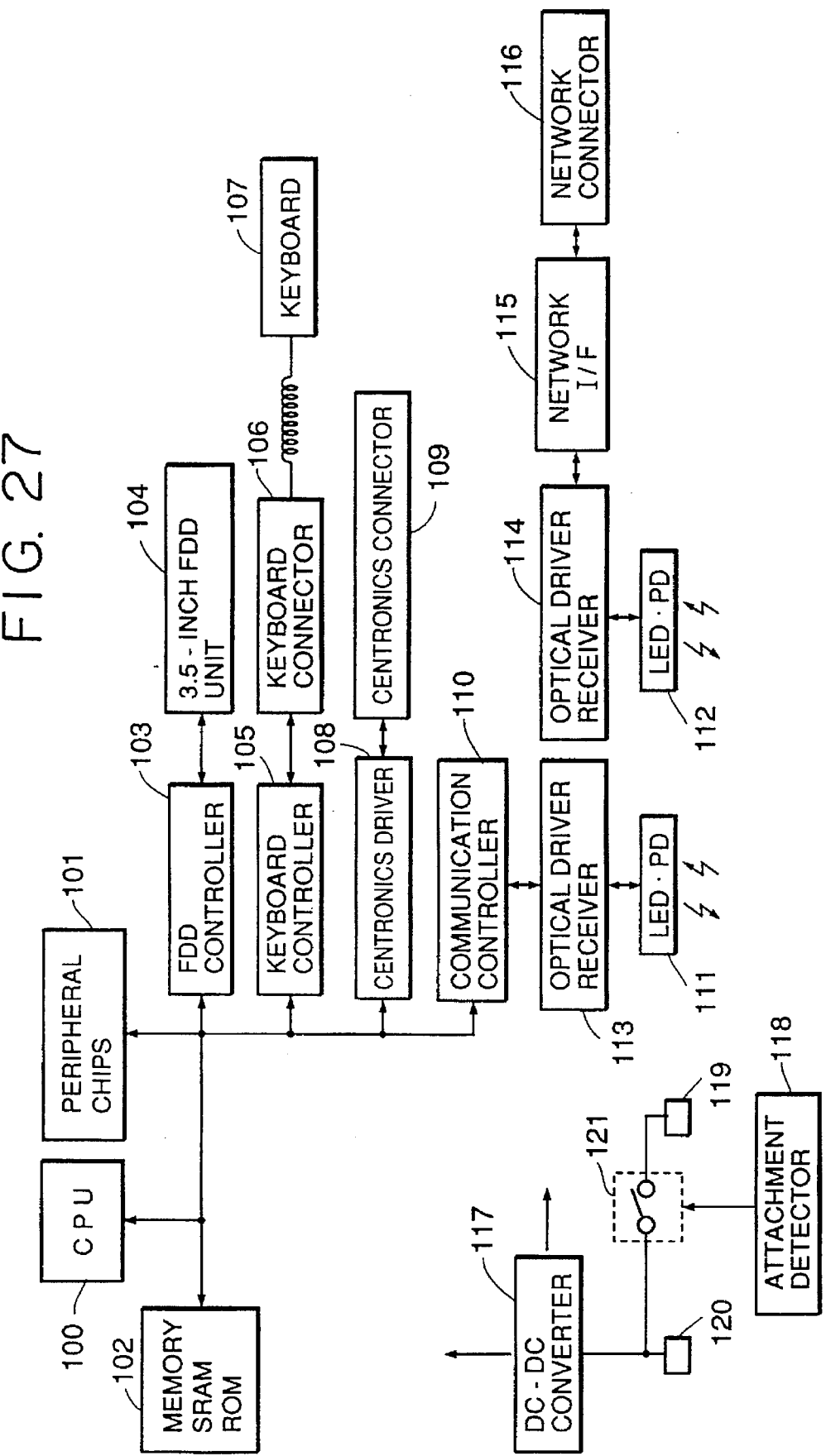
FIG. 27 is a schematic block diagram of the subsidiary apparatus of the third embodiment.

FIG. 27 is a block diagram of the construction of the subsidiary apparatus 130.

A combination of CPU 100, peripheral chips 101 and a memory 102 performs electrical control of the entire subsidiary apparatus 130. The subsidiary apparatus 130 comprises devices that are not provided in the main apparatus, for example, an FDD, a keyboard, a centronics interface and a network interface.

An FDD controller 103 is an LSI for controlling an FDD unit 104 for, for example, a 3.5-inch floppy disk. A keyboard controller 105 monitors the key input status of a keyboard 107 and informs the CPU 100 which key has been pressed. The data inputted by means of the FDD 104 or the keyboard 107 is sent to the main apparatus via a communication controller 110. A centronics driver 108 is an interface for outputting the data from the CPU 100 to a printer or the like. The centronics driver 108 is connected to a centronics connector 109. The communication controller 110, optical driver-receivers 111, 112 and LED-PD units 113, 114 are substantially the same as those in the main apparatus and will not be described herein.

A network interface 115 converts a signal from the main apparatus into a voltage and an impedance suitable for connection to a network. In this embodiment, it transfers a signal inputted from the main apparatus 50 through the channel B via the LED-PD unit 112 and the optical driver-receiver 114, to a network via the network connector 116. A DC—DC converter 117 is a power source of the subsidiary apparatus 130 and supplied with electricity from an AC adapter jack 120. Attachment detecting means 118, substantially the same as the attachment detector 29 of the main apparatus 50, connects a switch 121 when detecting attachment of the subsidiary apparatus 130 to the main apparatus 50, thereby supplying electricity from the AC adapter 120 to the electrodes 119 of the subsidiary apparatus which contact the electrodes 35 of the main apparatus.

Figure 28:
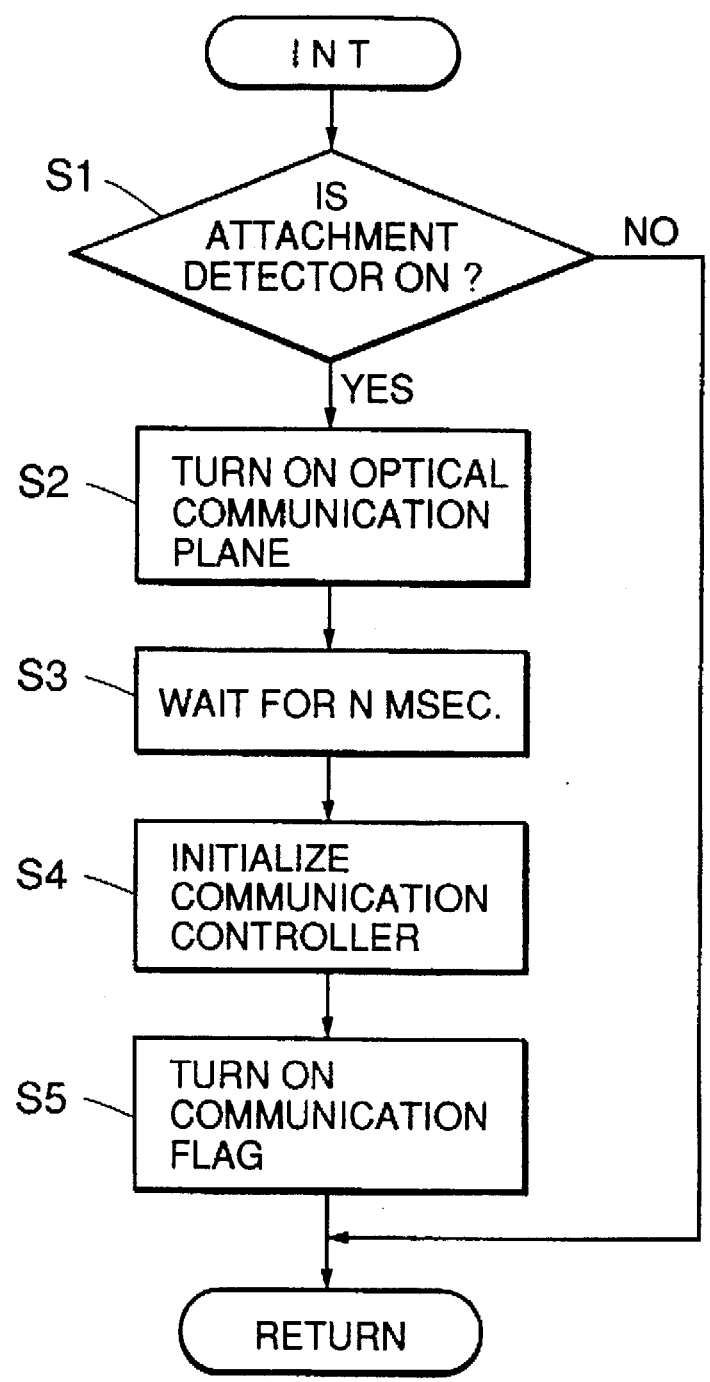
FIG. 28 is flowchart of the interrupt operation caused by the attachment detecting means.

FIG. 28 is a flowchart the on/off control operation of an optical communication plane 41 of the main apparatus 50 of the electronic appliance of this embodiment.

When the subsidiary apparatus 130 is attached to the main apparatus 50, an interruption signal is generated by a circuit as shown of FIG. 26(A), thereby interrupting the CPU 10. By this interruption, the operation proceeds to Step S1, where the attachment detector 45 checks again whether the subsidiary apparatus 130 has been attached to the main apparatus 50. If attachment of the subsidiary apparatus 130 is not confirmed, the interruption operation is ended.

If attachment of the subsidiary apparatus 130 is confirmed, the operation proceeds to Step S2, where the optical communication plane 41 is switched. More specifically, data having the fourth bit at a high level is outputted to the power source plane I/O 30 shown in FIG. 25 to make a signal 300 at a high level so as to switch on a switch 301, that is, one of the plane switches 31 corresponding to the optical communication plane 41. Thereby, power from the DC—DC converter 32 is supplied to the optical communication plane 41. In Step S3, the operation waits for N msec. until the power becomes stable. In Step S4, the communication controller 24 is initialized. In Step S5, the communication flag provided on the memory 102 is turned on. The interruption routine is thus completed.

Figure 29:
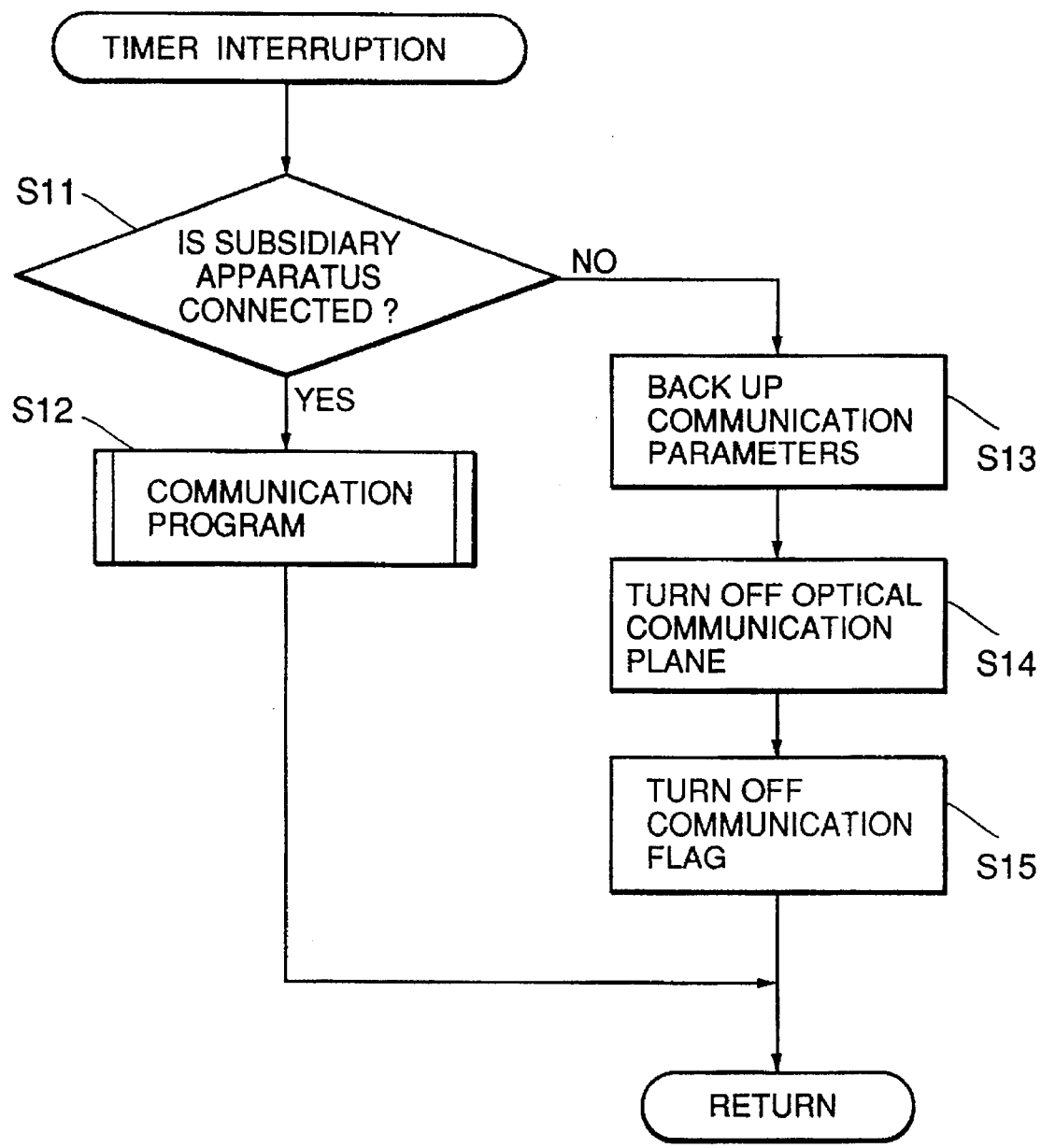
FIG. 29 is a flowchart of the timer interrupt operation performed by the main apparatus.

FIG. 29 is a flowchart of the polling/selecting operation of the main apparatus 50. This operation is initiated by interruptions generated at a predetermined interval period by, for example, a program timer.

In Step S11, it is determined whether the subsidiary apparatus 130 has been attached, based on a signal from the attachment detector 29. If it has been attached, the operation proceeds to Step S12, where the communication routine with the subsidiary apparatus 130 is started. If it is determined in Step S11 that the subsidiary apparatus 130 has not been attached, the operation goes to Step S13, where parameters and the like needed for communication are backed up. In Step S14, the switch 301, that is, one of the plane switches 31, is turned off so as to discontinue the power supply to the optical communication plane 41. In Step S15, the communication flag is turned off in Step 209, thus completing the operation.

After the above operation, the communication routine in Step S12 is initiated only when the subsidiary apparatus is attached to the main apparatus 50 and, then, the communication flag is turned on by the interruption routine illustrated in FIG. 28.

Although not illustrated in the flowchart, when the main apparatus 50 is powered on, the status of the attachment detector 29 is checked during the power source initialization. If attachment is confirmed, the switch 301 is turned on so as to start supplying power to the optical communication plane 41 and, then, initialization of the communication controller 24, setting on the communication flag, and the like are performed.

Figure 30A:
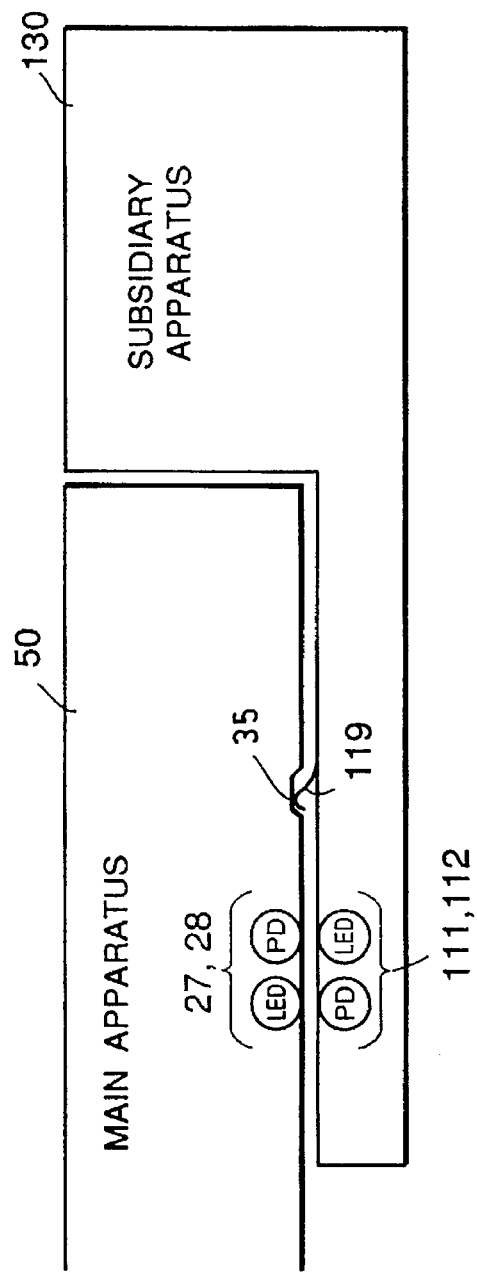
FIG. 30(A) illustrates connection between the main apparatus and the subsidiary apparatuses according to a modification of the third embodiment.
Figure 30B:
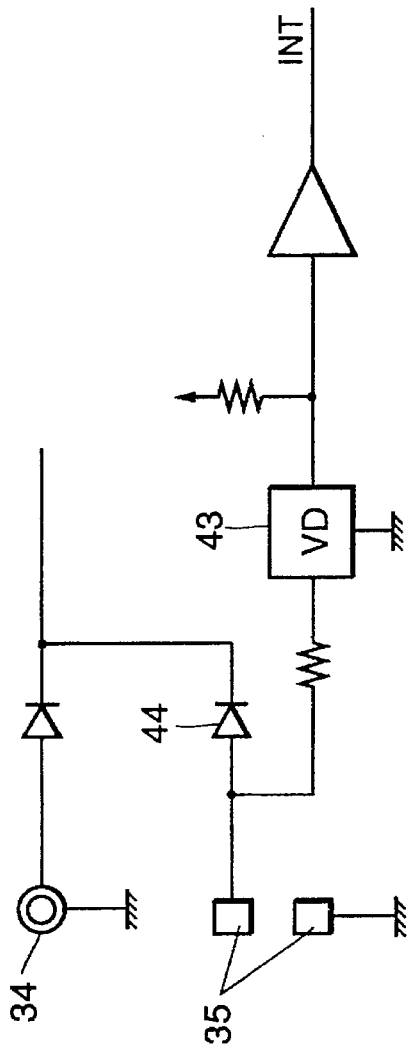
FIG. 30(B) illustrates a signal outputting circuit of a attachment detecting means provided in the main body according to the modification of the third embodiment.

FIGS. 30(A) and 30(B) illustrate the construction of a attachment detector according to a modification of the third embodiment. Components comparable to those described above are denoted by the same numerals. FIG. 30(A) is a sectional view of a main apparatus 50 and a subsidiary apparatus 130 attached to each other. FIG. 30(B) is a diagram of a circuit for generating an interruption signal (INT) for the CPU 10.

As described above, when the subsidiary apparatus 130 is attached to the main apparatus 50, electrodes 119 of the subsidiary apparatus 130 contact electrodes 35 of the main apparatus 50, thereby supplying power from the subsidiary apparatus 130 to the main apparatus 50. According to this modification, a voltage detecting element 43 is provided between the electrodes 35 and a diode 44 in the main apparatus 50. Based on an output signal from the voltage detecting element 43, it is determined whether the subsidiary apparatus 130 is attached to the main apparatus 50. Let it assumed that the detection voltage of the voltage detecting element 43 is 5.0 V. If a voltage of at least 5.0 V is being supplied through the electrodes 35, the output of the voltage detecting device 43 becomes a high level so that the interruption signal INT becomes a high level, thereby interrupting the CPU 10. If no power is supplied through the electrodes 35, that is, if the main apparatus 50 is separated from the subsidiary apparatus 130, the interruption signal INT becomes a low level, thereby enabling the CPU 10 of the main apparatus 50 to determine whether the subsidiary apparatus 130 is attached.

According to this modification, it is determined whether the main and subsidiary apparatuses are interconnected or separated. If they are separated, the power needed for the communication between the main and subsidiary apparatuses is switched off. If they are connected, the power is switched off. Therefore, unnecessary power consumption can be significantly reduced.

[Fourth Embodiment]

Figure 31:
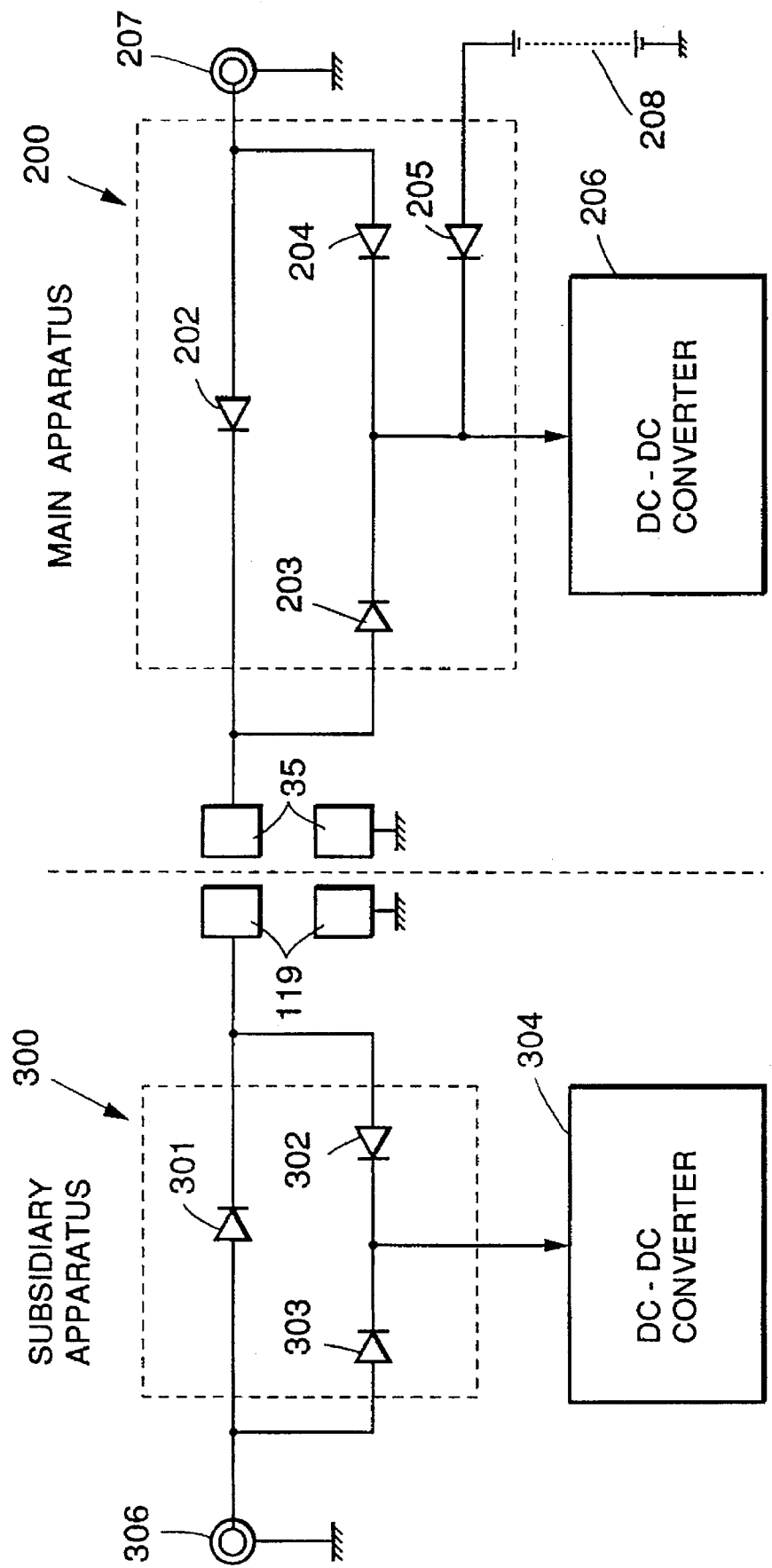
FIG. 31 is a schematic block diagram of a main apparatus and a subsidiary apparatus of a fourth embodiment of the information apparatus of the present invention.

FIG. 31 is a block diagram of the construction of an electronic appliance according to the fourth embodiment of the present invention. Similarly to the third embodiment, the electronic appliance of the fourth embodiment comprises a main apparatus 200 and a subsidiary apparatus 300.

The main apparatus 200 is supplied with power from a battery 208 and an AC adapter jack 207. The current from the battery 208 is supplied to a DC—DC converter 206 via a diode 205. The current from the AC adapter jack 207 is supplied to the DC—DC converter 206 via a diode 204. If power is supplied from both the battery 208 and the AC adapter jack 207, the DC—DC converter is supplied with the current from the AC adapter jack 207, whose voltage is higher than the voltage generated by the battery 208.

Similarly, power from an AC adapter jack 306 of the subsidiary apparatus 300 is supplied to a DC—DC converter via a diode 303. However, the power from the AC adapter jack 306 is also supplied to electrodes 119 via a diode 301.

Thereby, if only the main apparatus 200 attached to the subsidiary apparatus 200 as shown in FIG. 26 is connected to an AC adapter, the current from the AC adapter is supplied to the DC—DC converter 304 of the subsidiary apparatus 300 via the diode 202, the electrodes 35, the electrodes 119, and the diode 302. If only the subsidiary apparatus 300 is connected to an AC adapter, the current from the Ac adapter is supplied to the DC—DC converter 206 of the main apparatus 200 via the diode 301, the electrodes 35, the electrodes 119, and the diode 206.

If the main apparatus 200 and the subsidiary apparatus 300 are connected to AC adapters having different output voltages, the diodes prevents AC adapters from affecting each other and supplies both the DC—DC converters 206, 304 with the power from the AC adapter having a higher output voltage. The DC—DC converters 206, 304 thus generate DC current. If the main apparatus 200 and the subsidiary apparatus 300 are connected to AC adapters having the same output voltage, the DC—DC converters of the main and subsidiary apparatuses 200, 300 are supplied with power from the respective AC adapters.

Figure 32:
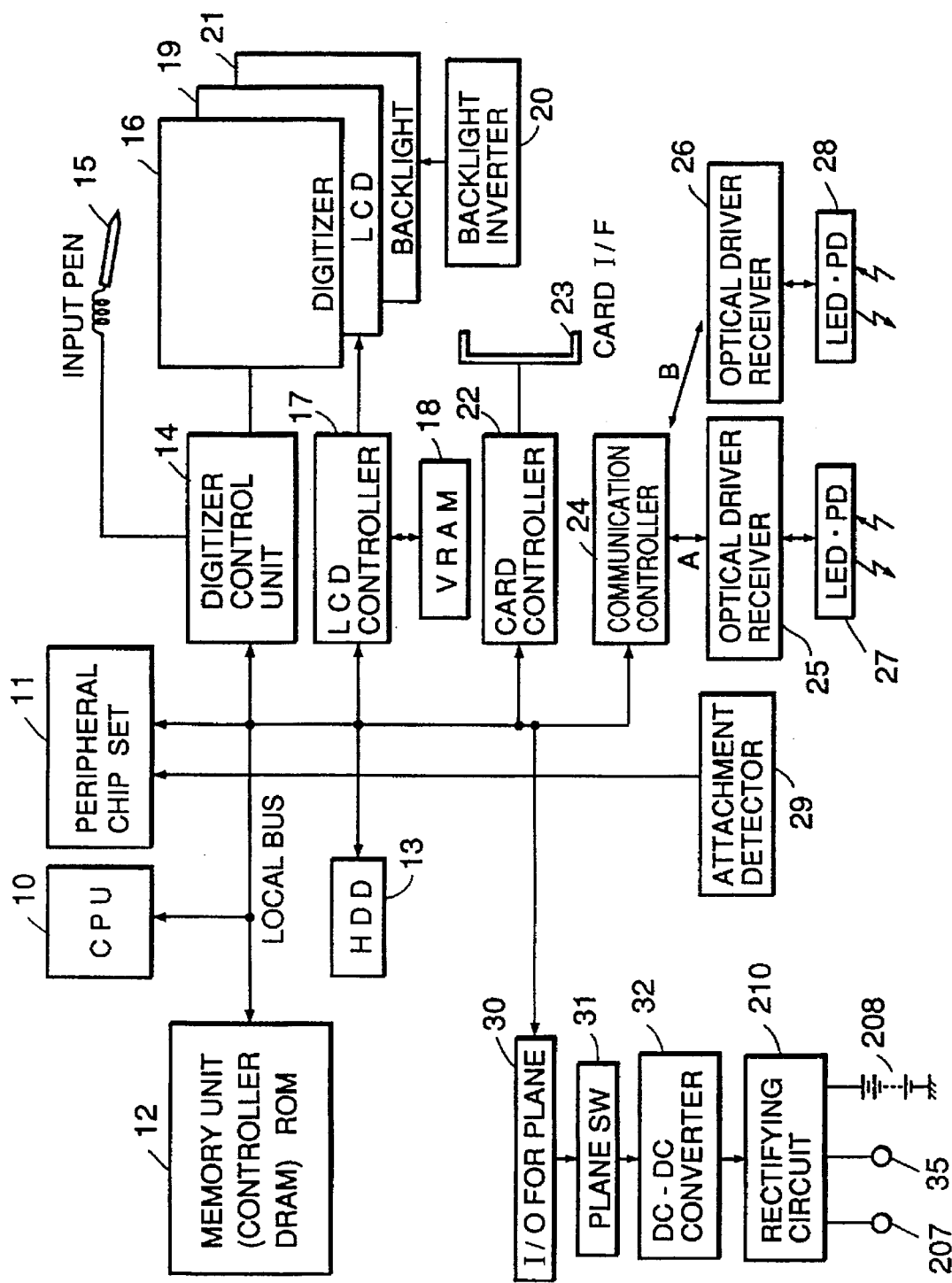
FIG. 32 is a block diagram of the construction of the main apparatus of the fourth embodiment.
Figure 33:
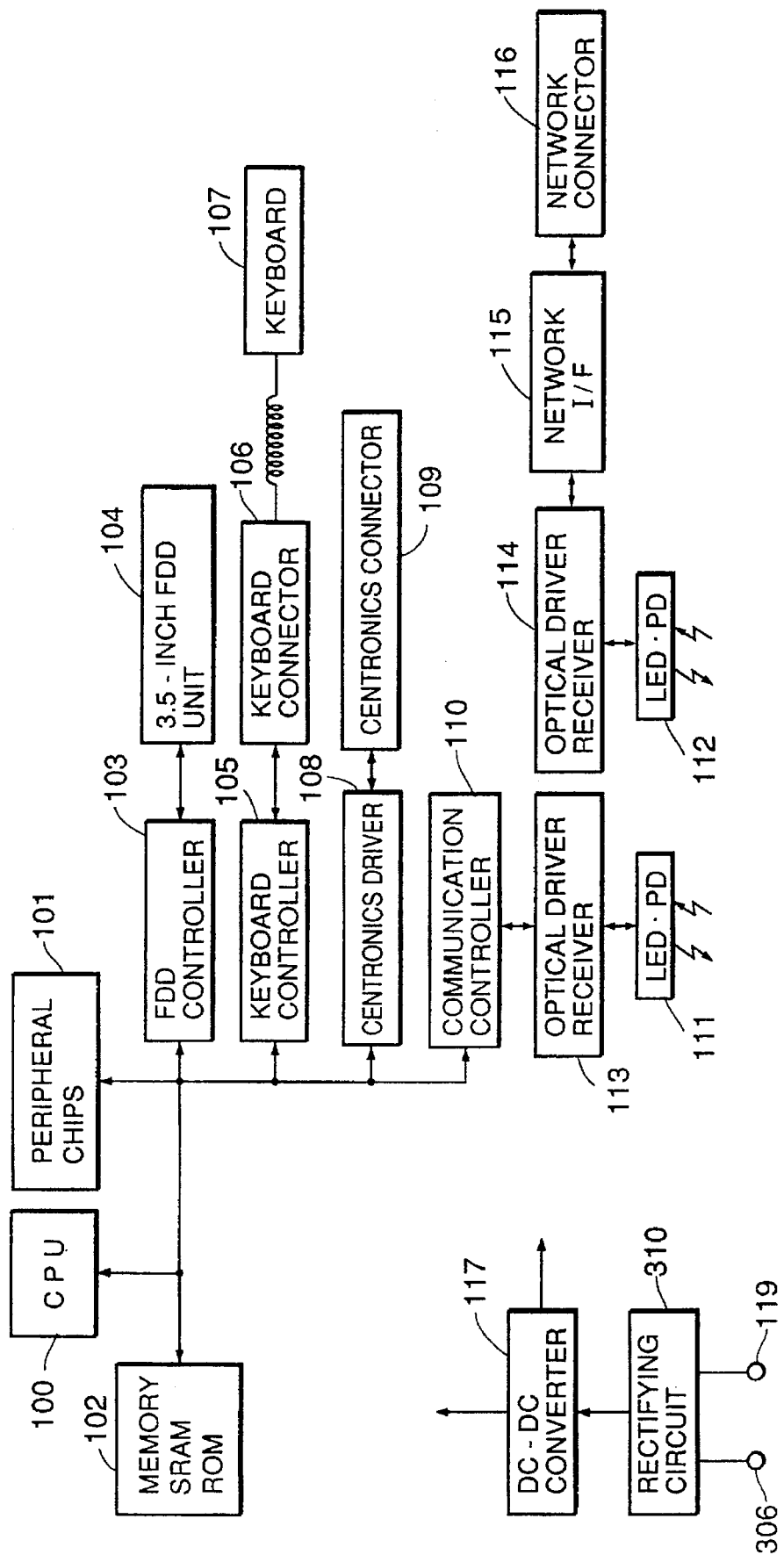
FIG. 33 is a block diagram of the subsidiary apparatus of the fourth embodiment.

FIG. 32 is a schematic block diagram of the construction of the main apparatus 200 of the electric appliance of the fourth embodiment. FIG. 33 is a block diagram of the construction of the subsidiary apparatus 300 of the electronic appliance of the fourth embodiment. Components comparable to those in FIGS. 24 and 27 are denoted by the same numerals and will not be described hereinafter. Rectifying circuits 210, 310 shown in FIGS. 32, 33 correspond to the diode circuits of the main and subsidiary apparatuses 200, 300, respectively, shown in FIG. 31. The power source plane and a attachment detector of the main apparatus 300 are substantially the same as those in the above-described embodiment, and will not be described below.

Figure 34:
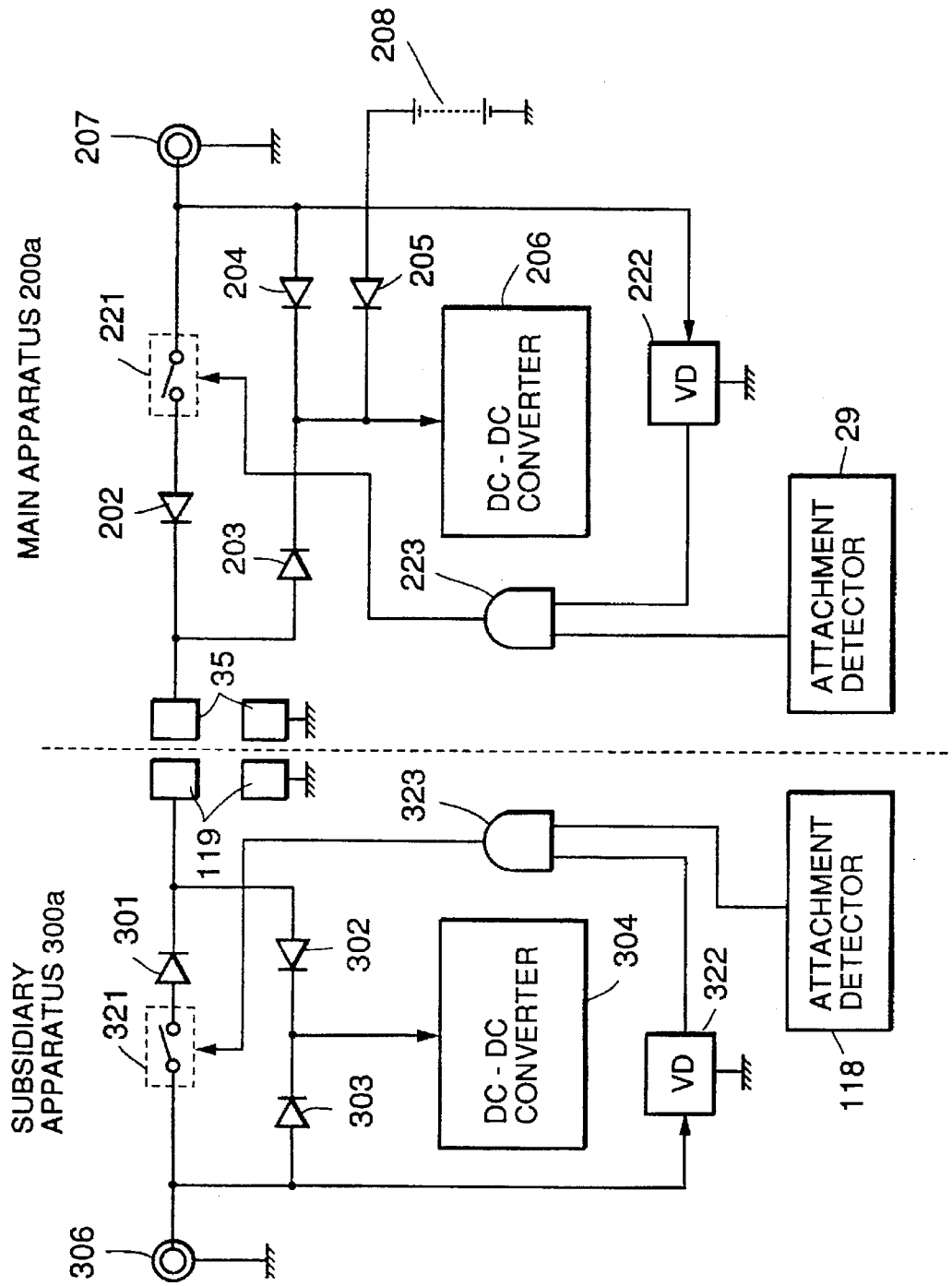
FIG. 34 is a schematic block diagram of a main apparatus and a subsidiary apparatus according to a modification of the fourth embodiment.

FIG. 34 is a block diagram of an electronic appliance according to a modification of the fourth embodiment. Components comparable to those in FIG. 31 are denoted by the same numerals and will not be described again.

Referring to FIG. 34, if an AC adapter jack 207 of a main apparatus 200a is connected to an AC adapter and a voltage detecting element 222 detects a voltage of a predetermined level or higher, the voltage detecting means makes the output signal at a high level. In such a case, if the attachment detector 29 detects attachment of a subsidiary apparatus 300a, the output of an AND circuit 223 become a high level so as to turn on a switch 221, thereby enabling power supply from the main apparatus 200a to the subsidiary apparatus 300a. The switch 221 is turned on only in this state. In any other state, the switch 221 is turned off so that no current flows through electrodes 35 even if the AC adapter jack 207 is connected to an AC adapter.

Similarly, only when an attachment detector 118 of the subsidiary apparatus 300a detects attachment of the main apparatus 200a and a voltage detector 322 detects voltage from an AC adapter jack 306, the output of an AND circuit 323 becomes a high level. Thereby, a switch 321 is turned on so as to supply power from the AC adapter 306 to electrodes 119.

Because if the main and subsidiary apparatuses 200a, 300a are not attached but connected to AC adapters, no current flows portions including the electrodes 35, 119, this modification prevents short-circuit or the like, for example, even if the electrode portion accidentally receives a metal piece, such as a clip.

The switches 221, 321 may be FETs, semiconductor switches, or electromagnetic switches such as relays.

Figure 35:
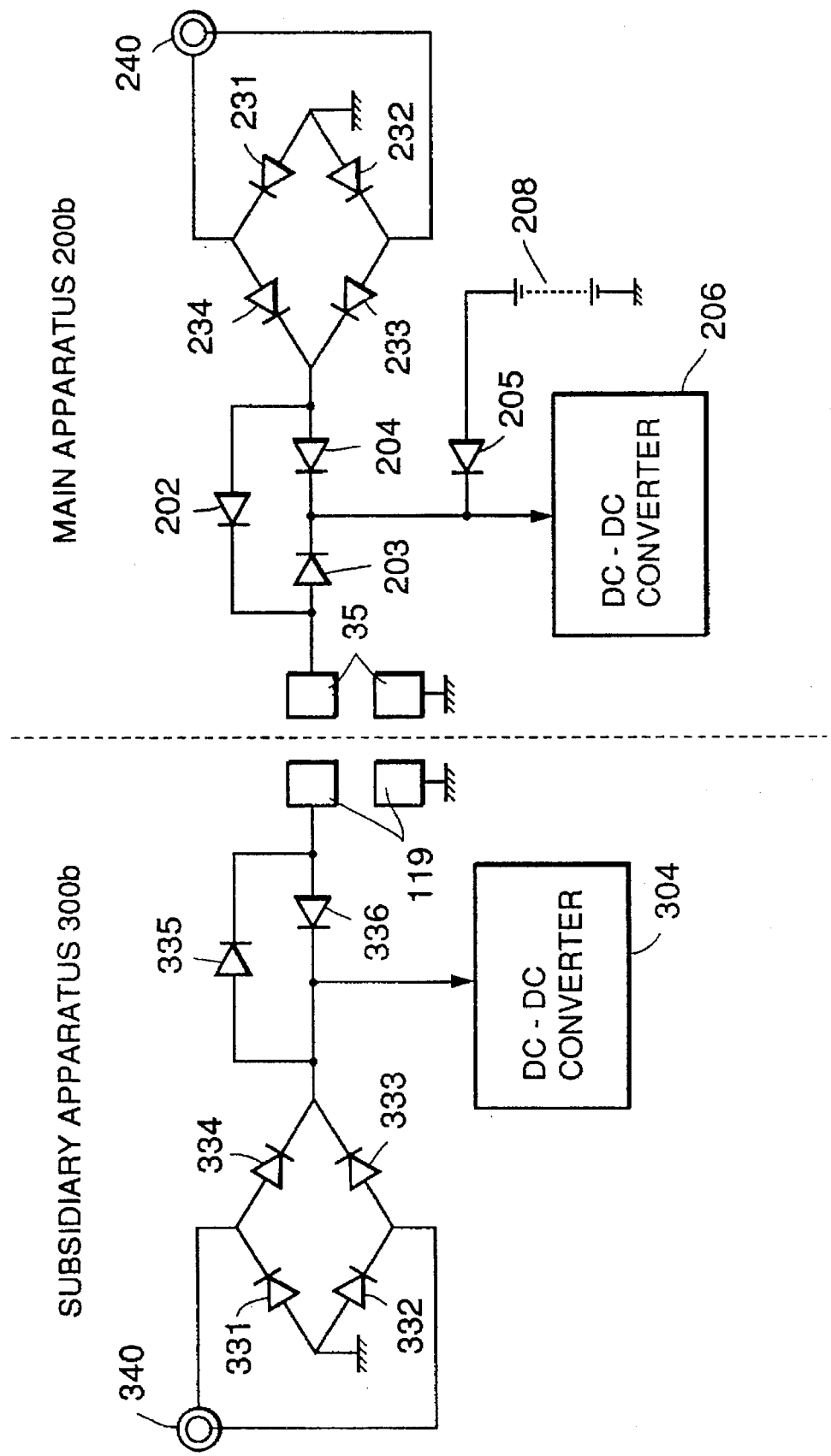
FIG. 35 is a schematic block of a main apparatus and a subsidiary apparatus according to another modification of the fourth embodiment.

FIG. 35 is a block diagram of main and subsidiary apparatuses according to another modification of the fourth embodiment. Components comparable to those in the above-mentioned figures are denoted by the same numerals and will not described again. Although the above embodiments are constructed suitably for an AC adapter having a polarity in which the outer-side terminal is positive and the inner-side terminal is negative, this modification achieves a circuit functional regardless of the polarity of an adapter.

Unlike the AC jack 207 in the above embodiments, an AC adapter jack 240 of a main apparatus 200b is not grounded. The terminals of the Ac adapter jack 240 are connected to a diode bridge comprising diodes 231–234, so that the cathode side of the diodes 233, 234 becomes positive and the anode side of the diodes 231, 232 becomes negative. By this construction, voltage is supplied to a DC—DC converter 206 and electrodes 35, whichever type of an AC adapter is connected to the main apparatus 200b. Similarly, a DC—DC converter 304 and electrodes 119 of the subsidiary apparatus 300b are supplied with power from an AC adapter connected to an AC adapter jack 340, regardless of the polarity of the AC adapter.

The main and subsidiary apparatuses 200b, 300b may be provided with switches similar to the switches 211, 321 as shown in FIG. 34.

According to the fourth embodiment, both the main and subsidiary apparatuses attached to each other are supplied with power if either one of them is connected to an AC adapter connected to a power source.

Because current is allowed to flow through the electrodes only when the main and subsidiary apparatuses are attached so as be operable together, the main and subsidiary apparatuses can be substantially safely left separated without causing short circuit or the like. Further, an AC adapter of either of the polarities can be used.

The above embodiments may be applied to either a system comprising a plurality of apparatuses or a single apparatus. Further, the above embodiments can be achieved by providing a system or an apparatus with a program for carrying out the present invention.

According to the above embodiment, because when an electronic appliance comprising a first apparatus and a second apparatus formed separately detects contact between the first and second apparatuses, power is supplied to the transmitting-receiving portions, thereby reducing the power consumption.

The power source connected to either one of the first or second apparatus will drive both the apparatuses.

Further, current is applied, only when necessary, to electrode portions for supplying power from one of the first and second apparatuses to the other apparatus, thereby preventing short-circuit of a power source or the like.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information apparatus comprising:

a first casing having information inputting means, display means, electrically connecting means, and plural first attaching means, each of said plural first attaching means being disposed at a different angle; and a second casing having electrically connecting means and second attaching means, said second attaching means being able to mate to each of the plural first attaching means, wherein said first casing and said second casing are attachable to each other at different angles by mating different ones of the plural first attaching means on said first casing to the second attaching means on said second casing, and wherein said information apparatus further comprises detaching means for detaching said first casing and said second casing from each other.

2. An information apparatus according to claim 1, wherein said second casing includes detaching means.

3. An information apparatus according to claim 1 or 2, wherein both of said first casing and said second casing have communication means for communicating to each other.

4. An information apparatus according to claim 3, wherein said communication means includes wireless communication means.

5. An information apparatus according to claim 4, wherein at least one of said first casing and said second casing has at least two units of communication means.

6. An information apparatus according to claim 5, wherein one of said first casing and said second casing has at least two units of electrically connecting means, and another of said first casing and said second casing has at least one unit of electrically connecting means.

7. An information apparatus according to claim 6, wherein at least a portion of said attaching means is provided on a bottom surface of said first casing so that at least a portion of said second casing is positioned adjacent to the bottom surface of said first casing when said second casing is attached to said first casing.

8. An information apparatus according to claim 5, wherein at least a portion of said attaching means is provided on a bottom surface of said first casing so that at least a portion of said second casing is positioned adjacent to the bottom surface of said first casing when said second casing is attached to said first casing.

9. An information apparatus according to claim 4, wherein one of said first casing and said second casing has at least two units of electrically connecting means, and another of said first casing and said second casing has at least one unit of electrically connecting means.

10. An information apparatus according to claim 9, wherein at least a portion of said attaching means is provided on a bottom surface of said first casing so that at least a portion of said second casing is positioned adjacent to the bottom surface of said first casing when said second casing is attached to said first casing.

11. An information apparatus according to claim 4, wherein at least a portion of said attaching means is provided on a bottom surface of said first casing so that at least a portion of said second casing is positioned adjacent to the bottom surface of said first casing when said second casing is attached to said first casing.

12. An information apparatus according to claim 3, wherein at least one of said first casing and said second casing has at least two units of communication means.

13. An information apparatus according to claim 12, wherein one of said first casing and said second casing has at least two units of electrically connecting means, and another of said first casing and said second casing has at least one unit of electrically connecting means.

14. An information apparatus according to claim 13, wherein at least a portion of said attaching means is provided on a bottom surface of said first casing so that at least a portion of said second casing is positioned adjacent to the bottom surface of said first casing when said second casing is attached to said first casing.

15. An information apparatus according to claim 12, wherein at least a portion of said attaching means is provided on a bottom surface of said first casing so that at least a portion of said second casing is positioned adjacent to the bottom surface of said first casing when said second casing is attached to said first casing.

16. An information apparatus according to claim 3, wherein at least a portion of said attaching means is provided on a bottom surface of said first casing so that at least a portion of said second casing is positioned adjacent to the bottom surface of said first casing when said second casing is attached to said first casing.

17. An information apparatus according to claim 1 or 2, wherein the electrically connecting means provided in said first casing and the electrically connecting means provided in said second casing each include means for enabling a power supply.

18. An information apparatus according to claim 17, wherein one of said first casing and said second casing has at least two units of electrically connecting means, and another of the first casing and the second casing has at least one unit of electrically connecting means.

19. An information apparatus according to claim 18, wherein at least a portion of said attaching means is provided on a bottom surface of said first casing so that at least a portion of said second casing is positioned adjacent to the bottom surface of said first casing when said second casing is attached to said first casing.

20. An information apparatus according to claim 17, wherein at least a portion of said attaching means is provided on a bottom surface of said first casing so that at least a portion of said second casing is positioned adjacent to the bottom surface of said first casing when said second casing is attached to said first casing.

21. An information apparatus according to claim 1, wherein at least a portion of said attaching means is provided on a bottom surface of said first casing that at least a portion of said second casing is positioned adjacent to the bottom surface of said first casing when said second casing is attached to said first casing.

22. An information apparatus according to claim 1, wherein said second casing has at least one surface which faces at least one side surface of said first casing when said second casing is attached to said first casing, and wherein at least a portion of the at least one surface of said second casing serves as guide means during an operation of attaching said first casing to said second casing.

23. An information apparatus according to claim 1, wherein said second casing has retractable stand means.

24. An information apparatus comprising:

a first casing having information inputting means, display means and electrically connecting means; and a second casing having electrically connecting means, wherein both of said first casing and said second casing have attaching means, whereby said first casing and said second casing are attachable to each other, and wherein at least one of said first casing and said second casing has cover means for covering the electrically connecting means of the at least one of said first casing and said second casing, said cover means being movable so as to permit interconnection of the electrically connecting means of the first and second casings in association with an operation of attaching said first casing and said second casing.

25. An information apparatus according to claim 24 or 34, wherein both of said first casing and said second casing have communication means for communicating with each other.

26. An information apparatus according to claim 25, wherein at least one of said attaching means of said first casing and said attaching means of said second casing enables said first casing and said second casing to be attached in at least two different manners in terms of relative directions.

27. An information apparatus according to claim 24 or 34, wherein said electrically connecting means provided in both of said first casing and said second casing include means for enabling a power supply.

28. An information apparatus according to claim 27, wherein at least one of said attaching means of said first casing and said attaching means of said second casing enables said first casing and said second casing to be attached in at least two different manners in terms of relative directions.

29. An information apparatus according to claim 24 or 34, wherein at least one of said attaching means of said first casing and said attaching means of said second casing enables at least one of said first casing and said second casing to be attached to each other in at least two different manners in terms of relative directions.

30. An information apparatus comprising:

an input pen for inputting information;

a casing having an input panel to which information is input via said input pen;

a pen holder, attached to said casing, for holding said input pen;

a cord for connecting said input pen with said casing; and $N(N \geq 1)$ hook units for hooking said cord, said N hook units being provided to hook said cord adjacent to a perimeter of said casing.

31. An information apparatus according to claim 30, wherein said casing further comprises housing means for housing said cord.

32. An information apparatus according to claim 31, wherein said housing means comprises roll-up means for rolling up said cord.

33. An information apparatus to claim 31 or 32, wherein said cord has a length sufficient to connect said housing means to the input panel via at least two of said hook units while at a same time permitting said input pen to input information to any area of the input panel.

34. An information apparatus comprising:

a first casing having information inputting means, display means and electrically connecting means; and a second casing having electrically connecting means, wherein both of said first casing and said second casing have attaching means whereby said first casing and said second casing are attachable to each other, and wherein said electrically connecting means of said first casing and said electrically connecting means of said second casing are interconnectable at different positions in association with an operation of attaching said first casing and said second casing.

35. An information apparatus comprising:

a first casing having information inputting means, display means and electrically connecting means; and a second casing having electrically connecting means, wherein both of said first casing and said second casing have attaching means, whereby said first casing and said second casing are attachable to each other, wherein said information apparatus further comprises detaching means for detaching said first casing and said second casing from each other, and wherein said attaching means provides two manners of attaching said first casing and said second casing in terms of relative directions, wherein said first casing has a substantially rectangular surface, and wherein a first portion of said attaching means is used for one of the two manners of attaching and a second portion of said attaching means is used for another of the two manners of attaching, the first portion and the second portion being arranged in positions so that the first portion substantially coincides with the second portion when the first portion is rotated substantially 90° about an intersecting point of two straight lines, each extending at 45°, respectively, from two vertices of a shorter side of the substantially rectangular surface of said first casing.

* * * * *

UNITED STATES PATENT AND TRADEMARK OFFICE
CERTIFICATE OF CORRECTION

PATENT NO. : 5,657,459         Page 1 of 5

DATED      : August 12, 1997

INVENTORS  : Yanagisawa et al.

It is certified that error appears in the above-identified patent and that said Letters Patent is hereby corrected as shown below:

On title page, item [56]

REFERENCES CITED

FOREIGN PATENT DOCUMENTS

Please insert the following foreign patents in date order:

```
8910390      12/1989     Germany
8909095      9/1990      Germany
```

ABSTRACT

Line 3, "has" should read --have--.

COLUMN 3

Line 43, "form" should read --from--.

UNITED STATES PATENT AND TRADEMARK OFFICE
CERTIFICATE OF CORRECTION

PATENT NO. : 5,657,459　　　　　　　　　　Page 2 of 5

DATED : August 12, 1997

INVENTORS : Yanagisawa et al.

It is certified that error appears in the above-identified patent and that said Letters Patent is hereby corrected as shown below:

COLUMN 4

Line 25, "separated" should read --separately--.

Line 36, "connected" should read --connected to--.

Line 40, "form" should read --from--.

COLUMN 5

Line 4, "lone" should read --line--.

COLUMN 10

Line 41, "attachmen" should read --attachment--.

COLUMN 12

Line 40, "and of" should read --and off--.

UNITED STATES PATENT AND TRADEMARK OFFICE
CERTIFICATE OF CORRECTION

PATENT NO. : 5,657,459

DATED : August 12, 1997

INVENTORS : Yanagisawa et al.

It is certified that error appears in the above-identified patent and that said Letters Patent is hereby corrected as shown below:

COLUMN 13

Line 63, "placement" should read --placements--.

COLUMN 14

Lines 20 and 21, "hooking it" should read --hooking it to--.

COLUMN 17

Line 41, "it one" should read --it to one--.

COLUMN 20

Line 23, "carious" should read --various--.

COLUMN 21

Line 46, "of" should read --off--.

UNITED STATES PATENT AND TRADEMARK OFFICE
CERTIFICATE OF CORRECTION

PATENT NO. : 5,657,459

DATED : August 12, 1997

INVENTORS : Yanagisawa et al.

It is certified that error appears in the above-identified patent and that said Letters Patent is hereby corrected as shown below:

COLUMN 22

Line 48, "flowchart" should read --flowchart of--.

Line 53, "of" should read --in--.

COLUMN 23

Line 53, "it" should read --it be--.

COLUMN 24

Line 30, "Ac" should read --AC--.

COLUMN 25

Line 16, "flows" should read --flows between--.

Line 33, "Ac" should read --AC--.

UNITED STATES PATENT AND TRADEMARK OFFICE
CERTIFICATE OF CORRECTION

PATENT NO. : 5,657,459

DATED : August 12, 1997

INVENTORS : Yanagisawa et al.

It is certified that error appears in the above-identified patent and that said Letters Patent is hereby corrected as shown below:

COLUMN 27

Line 62, "that" should read --so that--.

COLUMN 28

Line 65, "to" should read --according to--.

Signed and Sealed this

Sixth Day of October, 1998

Attest:

BRUCE LEHMAN

Attesting Officer    Commissioner of Patents and Trademarks